US008364919B2

(12) United States Patent
Sano et al.

(10) Patent No.: US 8,364,919 B2
(45) Date of Patent: Jan. 29, 2013

(54) REMOTE COPY SYSTEM AND METHOD

(75) Inventors: Kazuhide Sano, Fujinomiya (JP); Katsuhiro Okumoto, Odawara (JP); Shuji Kondo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 12/211,393

(22) Filed: Sep. 16, 2008

(65) Prior Publication Data

US 2010/0011179 A1     Jan. 14, 2010

(30) Foreign Application Priority Data

Jul. 8, 2008    (JP) .............................. 2008-178169

(51) Int. Cl.
     *G06F 12/00*      (2006.01)
(52) U.S. Cl. .................................................. 711/162
(58) Field of Classification Search .................. 711/162
     See application file for complete search history.

(56) References Cited

U.S. PATENT DOCUMENTS

| | | | |
|---|---|---|---|
| 6,035,412 A * | 3/2000 | Tamer et al. .................... | 714/6.3 |
| 6,237,008 B1 | 5/2001 | Beal et al. | |
| 7,082,506 B2 | 7/2006 | Nakano et al. | |
| 2001/0029570 A1 | 10/2001 | Yamamoto et al. | |
| 2003/0188233 A1 | 10/2003 | Lubbers et al. | |
| 2004/0024975 A1 | 2/2004 | Morishita et al. | |
| 2004/0230859 A1 | 11/2004 | Cochran et al. | |
| 2004/0267829 A1 | 12/2004 | Hirakawa et al. | |
| 2005/0052921 A1 | 3/2005 | Butterworth et al. | |
| 2005/0071710 A1 | 3/2005 | Micka et al. | |
| 2005/0081091 A1 | 4/2005 | Bartfai et al. | |
| 2005/0114410 A1 | 5/2005 | Fujibayashi | |
| 2005/0120092 A1 | 6/2005 | Nakano et al. | |
| 2005/0223267 A1 | 10/2005 | Fujibayashi | |
| 2005/0235121 A1 | 10/2005 | Ito et al. | |
| 2006/0064558 A1 * | 3/2006 | Cochran et al. ................ | 711/162 |
| 2006/0069889 A1 | 3/2006 | Nagaya et al. | |
| 2006/0085610 A1 | 4/2006 | Iwamura et al. | |
| 2006/0101214 A1 | 5/2006 | Mikami | |
| 2006/0101217 A1 | 5/2006 | Maki et al. | |
| 2007/0113025 A1 | 5/2007 | Ozaki et al. | |
| 2008/0104443 A1 * | 5/2008 | Akutsu et al. ..................... | 714/6 |

FOREIGN PATENT DOCUMENTS

| | | |
|---|---|---|
| EP | 1283469 A | 2/2003 |
| EP | 1591899 A | 11/2005 |
| EP | 1647891 | 4/2006 |
| JP | 10049418 A | 2/1998 |
| JP | 2003-122509 | 4/2003 |

(Continued)

OTHER PUBLICATIONS

European Search Report dated Jun. 23, 2009 for European Patent Application No. 09 25 0028.

*Primary Examiner* — Matthew Bradley
*Assistant Examiner* — Hamdy S Ahmed
(74) *Attorney, Agent, or Firm* — Mattingly & Malur, PC

(57) ABSTRACT

A remote copy system includes a first storage device performing data transmission/reception with a host computer, a second storage device receiving data from the first storage device, and a third storage device receiving data from the second storage device. The first storage device includes a logical volume, the second storage device includes a logical volume being a virtual volume, and the third storage device includes a logical volume. The first storage system changes the state of a first pair of the logical volumes based on the state of a second pair of the logical volumes. With such a remote copy system and a method for use therein, any data backup failure can be prevented.

45 Claims, 28 Drawing Sheets

FOREIGN PATENT DOCUMENTS

| | | |
|---|---|---|
| JP | 2005-309550 A | 11/2005 |
| JP | 2006-99440 A | 4/2006 |
| JP | 2006-113783 A | 4/2006 |
| JP | 2006-134164 A | 5/2006 |
| JP | 2006-139477 A1 | 6/2006 |
| JP | 2007-140601 A1 | 6/2007 |
| JP | 2008-134986 A | 6/2008 |
| WO | 0049500 A | 8/2000 |
| WO | 02/17056 | 2/2002 |
| WO | 2004017194 A2 | 2/2004 |
| WO | 2008028803 A | 3/2008 |

* cited by examiner

FIG. 3

| LOGICAL VOLUME NUMBER | STATE OF VOLUME | STATE OF INCORPORATION |
|---|---|---|
| 0000 | NORMAL | INCORPORATED |
| 0001 | CLOSED | INCORPORATED |
| 0002 | NOT IN USE | NOT INCORPORATED |
| 0003 | NORMAL | INCORPORATED |

| SELF LOGICAL VOLUME NUMBER | SELF VOLUME ATTRIBUTE | SELF JOURNAL GROUP NUMBER | SELF VIRTUAL VOLUME INFORMATION | TYPE OF PAIR | STATE OF PAIR | OTHER-END LOGICAL VOLUME NUMBER | OTHER-END JOURNAL GROUP NUMBER | OTHER-END VIRTUAL VOLUME INFORMATION | PAIR OPERATION COMMAND INFORMATION |
|---|---|---|---|---|---|---|---|---|---|
| 0000 | PRIMARY | – | INCORPORATED | SYNCHRONOUS | PAIR | 1000 | – | VIRTUAL | CASCADE |
| 0001 | PRIMARY | – | INCORPORATED | SYNCHRONOUS | Suspend | 1001 | – | VIRTUAL | CASCADE |
| 0002 | NOT IN USE | – | – | – | – | 1002 | – | – | – |
| 0003 | PRIMARY | – | INCORPORATED | SYNCHRONOUS | Copy | 1003 | – | INCORPORATED | 1:1 |

| 500 | | | | | | | | | |
|---|---|---|---|---|---|---|---|---|---|
| SELF LOGICAL VOLUME NUMBER (500A) | SELF VOLUME ATTRIBUTE (500B) | SELF JOURNAL GROUP NUMBER (500C) | SELF VIRTUAL VOLUME INFORMATION (500D) | TYPE OF PAIR (500E) | STATE OF PAIR (500F) | OTHER-END LOGICAL VOLUME NUMBER (500G) | OTHER-END JOURNAL GROUP NUMBER (500H) | OTHER-END VIRTUAL VOLUME INFORMATION (500I) |
| 1000 | SECONDARY | - | VIRTUAL | SYNCHRONOUS | PAIR | 0000 | - | INCORPORATED |
| 1000 | PRIMARY | 1 | VIRTUAL | ASYNCHRONOUS | PAIR | 2000 | 2 | INCORPORATED |
| 1001 | SECONDARY | - | VIRTUAL | SYNCHRONOUS | Suspend | 0001 | - | INCORPORATED |
| 1001 | PRIMARY | 1 | VIRTUAL | ASYNCHRONOUS | Suspend | 2001 | 2 | INCORPORATED |
| 1002 | NOT IN USE | - | - | - | - | 0002 | - | - |
| 1003 | SECONDARY | 0 | VIRTUAL | SYNCHRONOUS | Copy | 2003 | - | INCORPORATED |
| 1003 | PRIMARY | 1 | VIRTUAL | ASYNCHRONOUS | PAIR | 0003 | 2 | INCORPORATED |

| 600A | 600B | 600C | 600D | 600E | 600F | 600G | 600H |
|---|---|---|---|---|---|---|---|
| SELF GROUP NUMBER | SELF GROUP ATTRIBUTE | SELF GROUP STATE | IN-GROUP REGISTERED BITMAP | OTHER-END GROUP NUMBER | OTHER-END DEVICE MANUFACTURING NUMBER | JOURNAL CREATION SEQUENTIAL NUMBER | PURGE SEQUENTIAL NUMBER |
| 0 | NOT IN USE | NOT IN USE | 00000000 | – | – | – | – |
| 1 | PRIMARY | STARTED | 00000000 | 2 | 99999 | 5000 | 4000 |
| 2 | NOT IN USE | NOT IN USE | 00000000 | – | – | – | – |
| ... | ... | ... | ... | ... | ... | ... | ... |
| 255 | NOT IN USE | NOT IN USE | 00000000 | – | – | – | – |

FIG. 8

| 600A | 600B | 600C | 600D | 600E | 600F | 600G | 600I |
|---|---|---|---|---|---|---|---|
| SELF GROUP NUMBER | SELF GROUP ATTRIBUTE | SELF GROUP STATE | IN-GROUP REGISTERED BITMAP | OTHER-END GROUP NUMBER | OTHER-END DEVICE MANUFACTURING NUMBER | JOURNAL CREATION SEQUENTIAL NUMBER | RESTORE SEQUENTIAL NUMBER |
| 0 | NOT IN USE | NOT IN USE | 00000000 | - | - | - | - |
| 1 | NOT IN USE | NOT IN USE | 00000000 | - | 99999 | 5000 | - |
| 2 | SECONDARY | STARTED | D0000000 | 2 | 33333 | - | 4000 |
| ... | ... | ... | ... | ... | ... | ... | ... |
| 255 | NOT IN USE | NOT IN USE | 00000000 | - | - | - | - |

| | |
|---|---|
| COMMAND CODE | ~701A |
| WITH/WITHOUT CASCADE CONFIGURATION COMMAND | ~701B |
| SECOND-STORAGE-SYSTEM DEVICE MANUFACTURING NUMBER | ~701C |
| CASCADE-CONFIGURATION-COMMAND-RECEIVING LOGICAL VOLUME NUMBER | ~701D |
| ASYNCHRONOUS-COPY-PAIR PRIMARY LOGICAL VOLUME NUMBER | ~701E |
| ASYNCHRONOUS-COPY-PAIR SECONDARY LOGICAL VOLUME NUMBER | ~701F |
| THIRD-STORAGE-SYSTEM DEVICE MANUFACTURING NUMBER | ~701G |
| THIRD-STORAGE-SYSTEM SUBSYSTEM ID | ~701H |
| COPY MODE | ~701I |
| ERROR LEVEL | ~701J |

| | |
|---|---|
| COMMAND CODE | ~ 702A |
| CASCADE-CONFIGURATION-COMMAND LOGICAL VOLUME NUMBER | ~ 702B |
| SECOND-STORAGE-SYSTEM DEVICE MANUFACTURING NUMBER | ~ 702C |
| SECOND-STORAGE-SYSTEM SUBSYSTEM ID | ~ 702D |
| ASYNCHRONOUS-COPY-PAIR PRIMARY LOGICAL VOLUME NUMBER | ~ 702E |
| THIRD-STORAGE-SYSTEM DEVICE MANUFACTURING NUMBER | ~ 702F |
| THIRD-STORAGE-SYSTEM SUBSYSTEM ID | ~ 702G |
| ASYNCHRONOUS-COPY-PAIR SECONDARY LOGICAL VOLUME NUMBER | ~ 702H |
| COPY MODE | ~ 702I |
| ERROR LEVEL | ~ 702J |

REMOTE COPY SYSTEM AND METHOD

CROSS-REFERENCES TO RELATED APPLICATIONS

This application relates to and claims priority from Japanese Patent Application No. P2008-178169, filed on Jul. 8, 2008, the entire disclosure of which is incorporated herein by reference.

BACKGROUND OF THE INVENTION

1. Field of the Invention

The present invention relates to a storage system and, more specifically, to a remote copy system and method with which data replication is performed among a plurality of storage systems.

2. Description of Related Art

For replication of data stored in a storage system in regular use (referred to as a first storage system) to other storage systems (referred to as second and third storage systems), with a well-known technology, the second storage system keeps only one replication of replication-target data of the first storage system, and the replication data is available for the third storage system without having to use any redundant logical volume for remote copy use. An example includes Patent Document 1 (JP-A-2003-122509).

SUMMARY OF THE INVENTION

As described above, with such a previous technology, for the third storage system located away from the first storage system to have replication of data of the first storage system, the second storage system is disposed between the first and third storage systems for temporary storage of data to be transferred to the third storage system, thereby implementing a long-distance remote copy with prevention of any possible data loss.

The issue here is that users may need a remote copy system designed with attention to the cost of system operation but yet the system is expected to improve the failure-resistance properties of data by long-distance remote copy, e.g., in a case where making the third storage system only keep a replication of data stored in the first storage system. If this is the case, size reduction as much as possible is desired for logical volumes to be used in the second storage system disposed between the first and third storage systems.

As a solution of such a problem, in a well-known remote copy system, the second storage system disposed between the first and third storage systems uses logical volumes being virtual, i.e., not real volumes.

The concern of such a remote copy system is that, however, after a pair (first pair) is established between any one logical volume of the first storage system and any one virtual volume of the second storage system, another pair (second pair) is established between any other virtual volume of the second storage system and any other logical volume of the third storage system. With such a pair setting, because the second storage system has no real volume, until the establishment of the second pair, the second storage system cannot keep any update data of the first storage system, thereby failing to back up the data of the first storage system onto the third storage system.

The invention is proposed in consideration of such problems, and an object thereof is to provide a remote copy system and method with which any data backup failure can be prevented.

In order to achieve the object above, a first aspect of the invention is directed to a remote copy system that includes: a first storage device that is connected to a host computer, and performs data transmission/reception with the host computer; a second storage device that is connected to the first storage device, and receives data coming from the first storage device; and a third storage device that is connected to the second storage device, and receives data coming from the second storage device. In the remote copy system, the first storage device includes a first storage area for writing of the data provided by the host computer, the second storage device includes a virtualized data storage area defined by a logical address being a writing destination of the data provided by the first storage device, and the third storage device includes a second storage area being a copy destination of the first storage area. The first storage device includes a first pair change section that changes the state of a first pair of the first storage area and the virtualized data storage area, and the first pair change section changes the state of the first pair based on the state of a second pair of the virtualized data storage area and the second storage area.

With such a remote copy system of the first aspect, the state of the second pair is used as a basis to change the state of the first pair so that the setting of the first pair can be started after completion of the setting of the second pair, for example.

Also in order to achieve the object above, a second aspect of the invention is directed to a remote copy method for use with a remote copy system that includes: a first storage device that is connected to a host computer, and performs data transmission/reception with the host computer; a second storage device that is connected to the first storage device, and receives data coming from the first storage device; and a third storage device that is connected to the second storage device, and receives data coming from the second storage device. In the remote copy method, the first storage device includes a first storage area for writing of the data provided by the host computer, the second storage device includes a virtualized data storage area defined by a logical address being a writing destination of the data provided by the first storage device, and the third storage device includes a second storage area being a copy destination of the first storage area. The method includes the step of changing the state of a first pair of the first storage area and the virtualized data storage area based on the state of a second pair of the virtualized data storage area and the second storage area.

With such a remote copy method of the second aspect, the state of the second pair is used as a basis to change the state of the first pair so that the setting of the first pair can be started after completion of the setting of the second pair, for example.

According to the aspects of the invention, the setting of the first pair can be started after completion of the setting of the second pair, for example. This thus favorably enables the invention to reflect the data of the first storage device to the third storage device via the second storage device, thereby being able to prevent any possible data backup failure.

BRIEF DESCRIPTION OF THE DRAWINGS

FIG. 3 is a configuration diagram for illustrating an exemplary volume information table;

FIG. 4 is a configuration diagram for illustrating an exemplary pair management table;

FIG. 5 is a configuration diagram for illustrating another exemplary pair management table;

FIG. 7 is a configuration diagram for illustrating an exemplary journal group management table;

FIG. 8 is a configuration diagram for illustrating another exemplary journal group management table;

FIG. 15 is a configuration diagram for illustrating the data format of a cascade configuration command;

FIG. 16 is a configuration diagram for illustrating the data format of an asynchronous copy pair setting command;

DESCRIPTION OF THE PREFERRED EMBODIMENTS

In the below, embodiments of the invention will be described in detail by referring to the accompanying drawings.

First Embodiment

Figure 1:
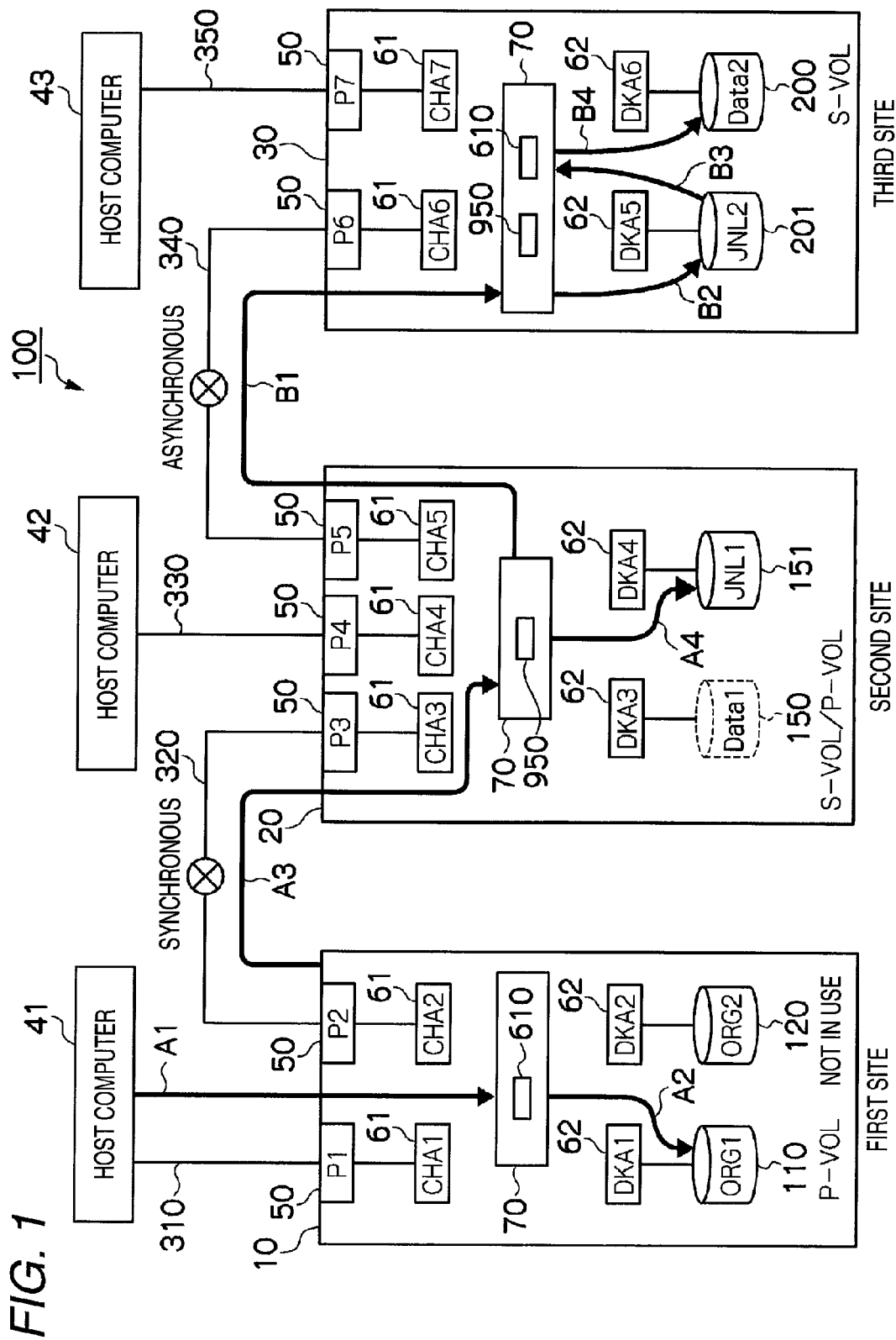
FIG. 1 is a block diagram for illustrating the configuration of a remote copy system.

FIG. 1 is a block diagram for illustrating the configuration of a remote copy system. Such a remote copy system 100 is configured to include a first site, i.e., primary site or main site, a second site, i.e., secondary site or local site, and a third site, i.e., remote site. The second site is located close to the first site, and the third site is located away from the first site.

The first site is configured to include a first storage system 10, and a host computer 41 connected to the first storage system 10 over a communications line 310. The first site serves as an active data processing system. The second site is configured to include a second storage system 20, and a host computer 42 connected to the second storage system 20 over a communications line 330. The third site is configured to include a third storage system 30, and a host computer 43 connected to the third storage system 30 over a communications line 350. The third site serves as a standby data processing system. The first and second storage systems 10 and 20 are connected to each other over a communications line 320, and the second and third storage systems 20 and 30 are connected to each other over a communications line 340. Note here that the communications lines 310 to 350 may be directly connected by a connection line such as fiber cable, or may be connected via a wide-area line such as the Internet.

Figure 2:
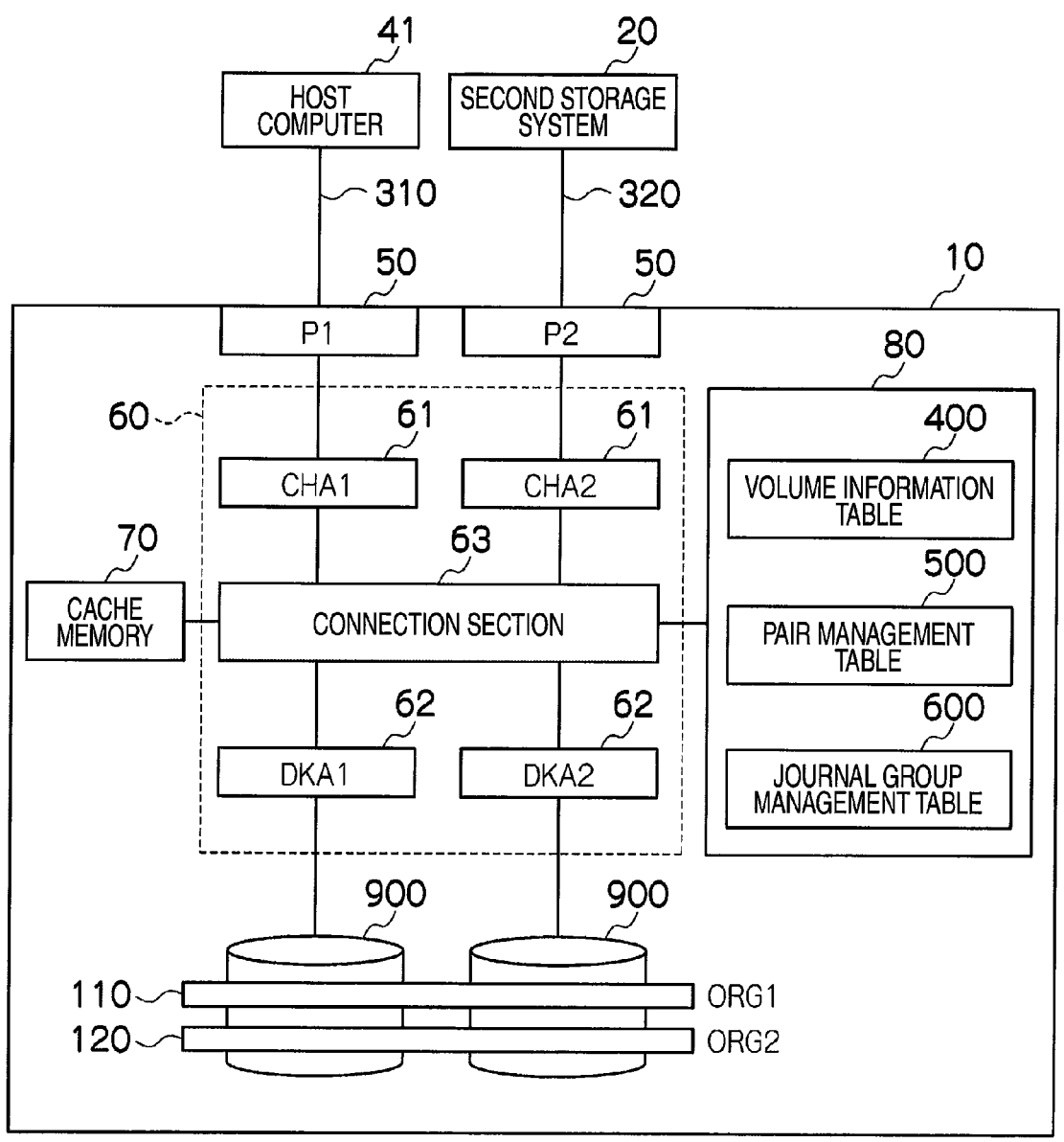
FIG. 2 is a block diagram for illustrating the hardware configuration of a first storage device of FIG. 1.

By referring to FIGS. 1 and 2, described next is the hardware configuration of the first storage system 10. FIG. 2 is a block diagram for illustrating the hardware configuration of the first storage system of FIG. 1. The first storage system 10 is configured to include channel ports 50, channel adaptors 61, disk adaptors 62, a connection section 63, a cache memory 70, a shared memory 80, and physical volumes 900.

The channel ports 50 are respectively connected to the communications lines 310 and 320, and are each used mainly as an input/output section for data input/output to/from the host computer 41 and the second storage system 20. The channel adaptors 61 are each configured as a microcomputer system provided with a microprocessor, a memory, a communications interface, and others, and are each used mainly as an interface between the host computer 41 and the second storage system 20. The cache memory 70 and the shared memory 80 are shared for use by the channel adaptors 61 and the disk adaptors 62 via the connection section 63. The shared memory 80 is used mainly for storage of control information, commands, and others, and stores therein various tables, i.e., a volume information table 400, a pair management table 500, and a journal group management table 600 (details thereof are left for later description). The cache memory 70 is used mainly for temporary storage of data.

The disk adaptors 62 are each configured as a microcomputer system provided with a microprocessor, a memory, a communications interface, and others, and each perform data writing or reading to/from the physical volumes 900. Such data writing or reading is performed by converting a logical-addressing data access request coming from the channel adaptors 61 into a physical-addressing data access request. When the physical volumes 900 are configuring a disk array of RAID (Redundant Array of Inexpensive Disks) by a plurality of disk drives, the disk adaptors 62 each perform data access in accordance with the RAID configuration. The disk adaptors 62 also each perform replication control or remote copy control for various purposes, e.g., replication management of data stored in the physical volumes 900, backup control, and data loss prevention in disaster situations (disaster recovery).

The connection section 63 establishes a connection among the channel adaptors 61, the cache memory 70, the shared memory 80, and the disk adaptors 62. The connection section 63 is configured by a high-speed bus performing data transfer by high-speed switching, e.g., an ultra-high-speed crossbar switch. Such a configuration considerably improves the communications performance between the channel adaptors 61, and enables high-speed file sharing and high-speed failover, for example. Alternatively, the cache memory 70 and the shared memory 80 may be configured by each different storage resource as described above, or the storage area of the cache memory 70 may be partially allocated for use as the shared memory 80. In the below, the configuration of including the channel adaptors 61, the disk adaptors 62, and the connection section 63 is especially referred to as disk controller 60.

The first storage system 10 includes one or more physical volumes 900, and provides a storage area accessible by the host computer 41. The storage area provided by the first storage system 10 includes a logical volume (ORG1) 110 and a logical volume (ORG2) 120, which are defined on the storage space of one or more of the physical volumes 900. The physical volumes 900 may be each a hard disk device, a flexible disk device, or others. The physical volumes 900 are not restrictively provided inside of the first storage system 10, and may be provided outside. If provided outside as such, the physical volumes 900 may be connected to the first storage system 10 directly or over a network.

In this embodiment, for convenience of description, the components, i.e., the channel ports 50, the channel adaptors 61, the disk adaptors 62, and the physical volumes 900, are in equal numbers. This is surely not restrictive, and these components may vary in number.

In the first storage system 10 of such a configuration, when receiving a write command and write data from the host computer 41, the channel adaptor 61 writes the write command into the shared memory 80, and writes the write data into the cache memory 70. On the other hand, the disk adaptors 62 are each monitoring the shared memory 80, and when detecting the writing of the write command into the shared memory 80, read the write data from the cache memory 70 in accordance with the write command, and write the reading result, i.e., write data, into the physical volumes 900.

When receiving a read command from the host computer 41, for example, the channel adaptor 61 writes the read command into the shared memory 80, and checks whether the cache memory 70 carries therein any data for reading. When the cache memory 70 carries therein any data for reading, the channel adaptor 61 reads the data from the cache memory 70 for transmission to the host computer 41. When the cache memory 70 carries no such data, the disk adaptor(s) 62 having detected the writing of the read command into the shared memory 80 read any data for reading from the physical volumes 900, and write the reading result, i.e., data, into the cache memory 70. The disk adaptor(s) 62 also write a notification as such into the shared memory 80. The channel adaptors 61 are also monitoring the shared memory 80, and when detecting the writing of data for reading into the cache memory 70, read the data from the cache memory 70 for transmission to the host computer 41.

Note that described by referring to FIG. 2 is the hardware configuration of the first storage system 10. The second and third storage systems 20 and 30 share almost the same hardware configuration as that of the first storage system 10, and thus are not described in detail again.

The second storage system 20 also includes one or more physical volumes 900, and includes a logical volume (Data1) 150 and a logical volume (JNL1) 151, which are defined on the storage space of one or more of the physical volumes 900. The logical volume (Data1) 150 is a virtual volume, i.e., has no real volume, that is provided virtually to allow the first storage system 10 to specify a storage area provided by the second storage system 20. The logical volume (Data1) 150 keeps hold of a replication of the logical volume (ORG1) 110. That is, in the relationship between the logical volume (ORG1) 110 and the logical volume (Data1) 150, the former is the primary logical volume, and the latter is the secondary logical volume.

The third storage system 30 also includes one or more physical volumes 900, and includes a logical volume (Data2) 200 and a logical volume (JNL2) 201, which are defined on the storage space of one or more of the physical volumes 900. The logical volume (Data2) 200 keeps hold of a replication of the logical volume (Data1) 150. That is, in the relationship between the logical volume (Data1) 150 and the logical volume (Data2) 200, the former is the primary logical volume, and the latter is the secondary logical volume.

In the below, the logical volume (ORG1) 110 presumably stores original data being a replication target. For easy distinction between the data being a replication target and data being a replication result, the logical volume accumulating the replication-target data is referred to as a primary logical volume (P-VOL), and the logical volume accumulating the replication-result data as a secondary logical volume (S-VOL). A combination of such primary and secondary logical volumes is referred to as pair.

By referring to FIGS. 3 to 8, described next is a table to be stored in the shared memory 80. FIG. 3 is a configuration diagram for illustrating an exemplary volume information table. A volume information table 400 is kept in each of the first to third storage systems 10 to 30, and stores information about logical volumes respectively defined thereby. As shown in FIG. 3, the volume information table 400 is configured by a logical volume number field 400A, a volume state field 400B, and an incorporation state field 400C.

The logical volume number field 400A stores numbers with which logical volumes defined on the storage space of the logical volumes 900 can be uniquely identified in the remote copy system 100. The volume state field 400B stores information about the state of the logical volumes corresponding to the numbers stored in the logical volume number field 400A, e.g., "normal", "closed", and "not in use". The incorporation state field 400C stores information about the incorporation state of the logical volumes corresponding to the numbers stored in the logical volume number field 400A, e.g., "incorporated", and "not incorporated". In this embodiment, for convenience of description, the logical volume number field 400A is so configured as to store therein numbers uniquely identifiable in the remote copy system 100. This is surely not the only option, and the logical volume number field 400A may store therein numbers uniquely identifiable in the respective storage systems, and the numbers may be uniquely identified in the remote copy system 100 together with identifiers assigned to the respective storage systems.

FIG. 4 is a configuration diagram for illustrating an exemplary pair management table. A pair management table 500 is kept in each of the first to third storage systems 10 to 30, and is used to manage pairs set to the logical volumes respectively defined thereby. As shown in FIG. 4, the pair management table 500 is configured by a self logical volume number field 500A, a self volume attribute field 500B, a self journal group number field 500C, a self virtual volume information field 500D, a pair type field 500E, a pair state field 500F, an other-end logical volume number field 500G, an other-end journal group number field 500H, an other-end virtual volume information field 500I, and a pair operation command field 500J. Note that FIG. 4 shows the pair management table 500 kept in the first storage system 10.

The fields, i.e., the self logical volume number field 500A, the self volume attribute field 500B, the self journal group number field 500C, and the self virtual volume information field 500D, are those related to the logical volumes of its own, i.e., logical volumes of the first storage system 10 keeping the pair management table 500. The self logical volume number field 500A stores numbers with which the logical volumes defined on the storage space of the physical volumes 900 can be uniquely identified in the remote copy system 100. The self volume attribute field 500B stores the attributes of the logical volumes corresponding to the numbers stored in the logical volume number field 400A, e.g., "primary", "secondary" and "not in use". The self journal group number field 500C stores numbers of journal groups (will be described later) including the logical volumes corresponding to the numbers stored in the logical volume number field 400A. Herein, when no such logical volume is included, "-" is stored for the journal group. The self virtual volume information field 500D stores information about virtual volumes of the logical volumes corresponding to the numbers stored in the logical volume number field 400A, e.g., "incorporated" and "virtual".

The fields, i.e., the other-end logical volume number field 500G, the other-end journal group number field 500H, and the other-end virtual volume information field 500I, are those related to logical volumes of any other storage system to be paired with the logical volumes of the first storage system 10 keeping the pair management table 500. Note that these fields, i.e., the other-end logical volume number field 500G, the other-end journal group number field 500H, and the other-end virtual volume information field 500I, are similar to the fields described above, i.e., the self logical volume number field 500A, the self journal group number field 500C, and the self virtual volume information field 500D, and thus are not described twice.

The fields, i.e., the pair type field 500E, the pair state field 500F, and the pair operation command field 500J, are those related to pairs of the logical volumes, i.e., pairs of the logical volumes corresponding to the numbers stored in the logical volume number field 400A and the logical volumes corresponding to the numbers stored in the other-end logical volume number field 500G. The pair type field 500E stores information about the types of pairs, e.g., "synchronous" and "asynchronous", and the pair state field 500F stores information about the states of pairs, e.g., "PAIR", "COPY", and "Suspend" (the details are left for later description). The pair operation command field 500J stores the details of operation commands for the pairs, e.g., "cascade", and "1:1" (the details are left for later description).

FIG. 5 is a configuration diagram for illustrating another exemplary pair management table. Although FIG. 4 shows the pair management table 500 kept in the first storage system 10, the pair management table 500 of FIG. 4 is different from the pair management tables 500 kept in the second and third storage systems 20, 30. That is, as shown in FIG. 5, the pair management table 500 kept in the second storage system 20 does not include the pair operation command field 500J, for example, but the remaining configuration is the same. Herein, because virtual volumes are defined in the second storage system 20, in FIG. 5, one logical volume is assigned two lines (records) in the self volume attribute field 500B respectively storing "primary" and "secondary".

Described now is journal data. For convenience of description, a logical volume whose data is updated, i.e., an update source, is referred to as an update-source logical volume, and a volume keeping a copy of such an update-source logical volume is referred to as a copy-carrying logical volume.

When a specific update-source logical volume is updated in data, the journal data is configured at least by the update data itself, and update information indicating the updated part of the update-source logical volume, e.g., logical address of the update-source logical volume. If journal data is retained when the update-source logical volume is updated in data, the journal data can be used to reproduce the update-source logical volume. That is, with an assumption that the update-source logical volume is synchronized with the copy-carrying logical volume at some point in time, and with an assumption that these volumes have the same data image, if the journal data is retained every time the update-source logical volume is updated in data after the synchronized point in time, by using the journal data retained as such, the data image of the update-source logical volume after the synchronized point in time can be reproduced in the copy-carrying logical volume. By using journal data as such, the data image of the update-source logical volume can be reproduced in the copy-carrying logical volume without requiring the capacity to be the same as that of the update-source logical volume. The logical volume retaining the journal data is referred to as journal logical volume. In this embodiment, the logical volume (JNL1) 151 and the logical volume (JNL2) 201 described above are the journal logical volumes.

Figure 6:
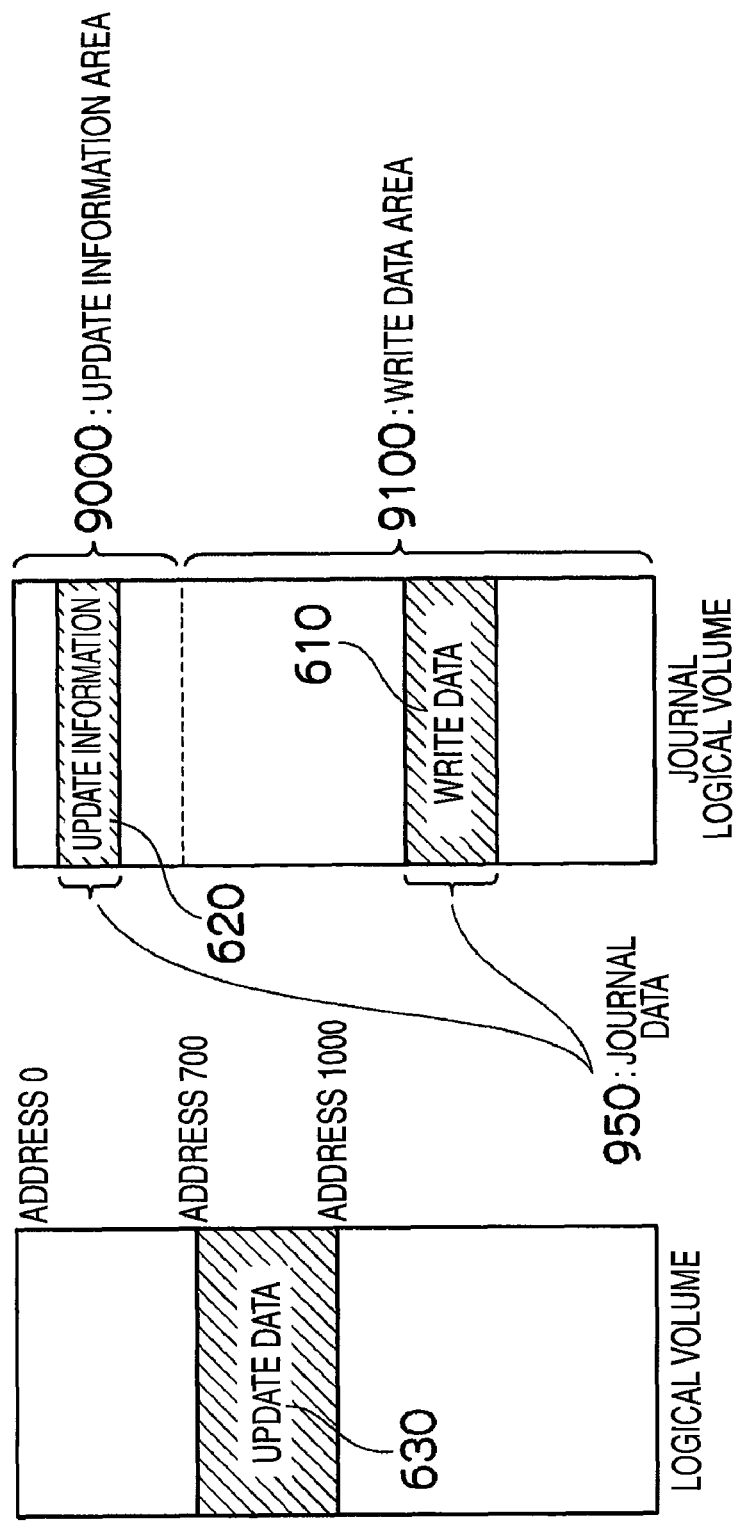
FIG. 6 is a conceptual diagram for illustrating journal data.

By referring to FIG. 6, the journal data is described in more detail. FIG. 6 is a conceptual diagram for illustrating the journal data. FIG. 6 shows the state in which data of a specific update-source logical volume from addresses of 700 to 1000 is updated by update data 630. The journal logical volume paired with this logical volume includes an update information area 9000, and a write data area 9100. The update data 630 is written into the write data area 9100 as write data 610. That is, the update data 630 and the write data 610 are the same data. Information about the update such as which part of the update-source logical volume has been updated, e.g., information indicating update of data in the update-source logical volume from addresses of 700 to 1000, is written into the update information area 9000 as update information 620. In this embodiment, in addition to the information related to the update, the update information includes sequential numbers assigned for guaranteeing the ordering of the update data 630.

Journal data 950 is configured by the write data 610 and the update information 620. In the update information area 9000, the update information 620 is stored from the head position in the updated order, and when the storage position of the update information 620 reaches the end of the update information area 9000, the update information 620 is started to be stored again from the head position of the update information area 9000. Similarly, in the write data area 9100, the write data 610 is stored from the head position in the updated order, and when the storage position of the write data 610 reaches the end of the write data area 9100, the write data 610 is started to be stored again from the head position of the write data area 9100. The capacity ratio between the update information area 9000 and the write data area 9100 may be set to a fixed value or set variable as required.

FIG. 7 is a configuration diagram for illustrating an exemplary journal group management table. A journal group denotes a group of volumes including one or more logical volumes storing data, and a logical volume storing journal data. The journal group management table 600 is kept in each of the first to third storage systems 10 to 30, and is used for management of journal groups set to the logical volumes respectively defined thereby. As shown in FIG. 7, the journal group management table 600 is configured by a self group number field 600A, a self group attribute field 600B, a self group state field 600C, an in-group registered bitmap field 600D, an other-end group number field 600E, an other-end serial number field 600F, a journal creation sequential number field 600G, and a purge sequential number field 600H. Note that FIG. 7 shows the journal group management table 600 kept in the second storage system 20.

The fields, i.e., the self group number field 600A, the self group attribute field 600B, the self group state field 600C, and the in-group registered bitmap field 600D, are those related to the journal groups of its own, i.e., the journal groups set to the logical volumes of the second storage system 20 keeping the journal group management table 600. The self group number field 600A stores numbers with which the journal groups can be uniquely identified in the respective storage systems. The self group attribute field 600B stores the attributes of the journal groups corresponding to the numbers stored in the self group number field 600A, e.g., "primary", "secondary", and "not in use". The self group state field 600C stores the states of the journal groups corresponding to the numbers stored in the self group number field 600A, e.g., "started", "stopped", and "not in use". The in-group registered bitmap field 600D stores information in which the logical volumes registered in the journal groups corresponding to the numbers stored in the self group number field 600A are each represented by a bitmap. In the pair management table 500 of FIG. 5, considered here is an exemplary case where, in the self logical volume number field 500A, the logical volumes corresponding to "1000" to "1003" are corresponding to the upper four digits of the bitmap. In this case, the logical volumes showing "1" in the self journal group number field 500C are those under the numbers of "1000", "1001", and "1003" in the self logical volume number field 500A. When these logical volumes are represented by a bitmap, the result will be "1101". As such, for the line showing "1" in the self group number field 600A of FIG. 7, stored in the in-group registered bitmap field 600D is "D0000000" with the most significant digit being "D" (=1101) displayed in hexadecimal.

The other-end group number field 600E and the other-end serial number 600F are those related to any another storage system to be paired with the journal group of the second storage system 20 keeping the journal group management table 600. The other-end group number field 600E stores numbers with which the journal groups can be uniquely identified in the respective storage systems. The other-end serial number 600F stores manufacturing numbers of the devices retaining and managing the journal groups corresponding to the numbers stored in the other-end group number field 600E, e.g., the manufacturing numbers of the respective storage systems.

The journal creation sequential number field 600G stores the latest sequential numbers assigned to the update information 620 on a journal group basis. The purge sequential number field 600H stores the sequential numbers of the journal data 950 that can be open, e.g., the sequential numbers of the latest journal data 950 read by a journal read command that will be described later. With such storage of numbers, the storage area having stored the journal data 950 up to the sequential number stored in the purge sequential number field 600H is left open, thereby allowing the logical volume (JNL1) 151 to retain the journal data 950 with less amount of storage capacity.

FIG. 8 is a configuration diagram for illustrating another exemplary journal group management table. Although FIG. 7 shows the journal group management table 600 kept in the second storage system 20, the journal group management table 600 of FIG. 7 is different from the journal group management table 600 kept in the third storage system 30. That is, as shown in FIG. 8, the journal group management table 600 kept in the third storage system 30 includes a restore sequential number field 600I as an alternative to the purge sequential number field 600H. The restore sequential number field 600I stores the sequential numbers of the latest journal data 950 through with restoring at the time of restoring from the logical volume (Data2) 200 of the third storage system 30 to the logical volume (Data1) 150 of the second storage system 20, for example.

By referring to FIGS. 1, 9, and 10, described next is the operation of reflecting data update to the logical volume (Data2) 200 of the third storage system 30 via the second storage system 20, i.e., the data update process. The data update here is the one made to the logical volume (ORG1) 110 of the first storage system 10.

Figure 9:
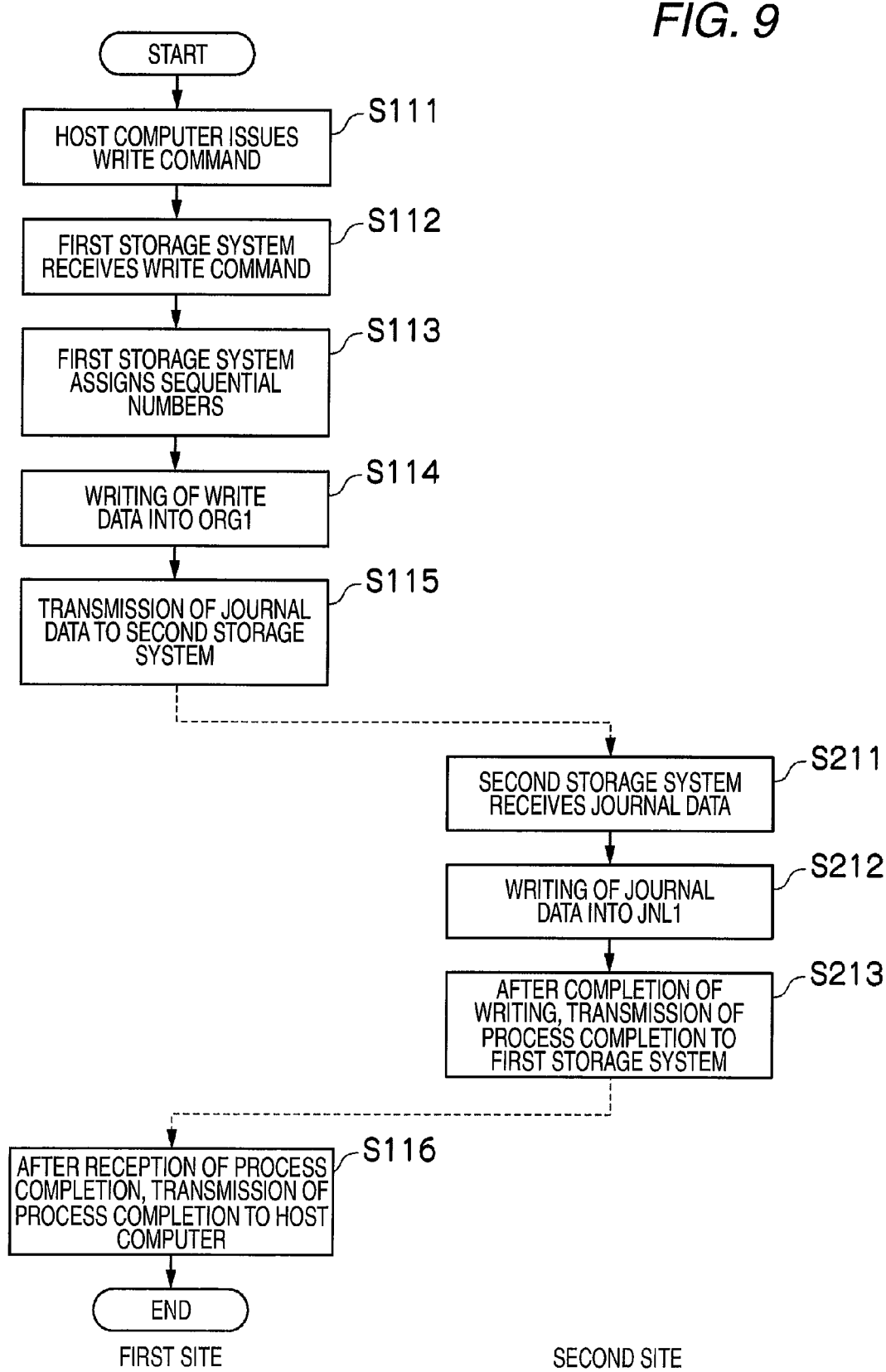
FIG. 9 is a flowchart of the operation related to remote copy between first and second sites.

FIG. 9 is a flowchart of the operation related to remote copy between the first and second sites. As shown in FIG. 9, when the host computer 41 makes a write access to the first storage system 10, the host computer 41 issues a write command (S111) for transmission to the channel port (P1) 50 of the first storage system 10 together with the write data 610.

The channel adaptor (CHA1·61 receives the write command and the write data 610 via the channel port (P1) 50 serving as a target (S112), and assigns sequential numbers on a write command basis (S113). The channel adaptor (CHA1) 61 also accumulates the write data 610 in the cache memory 70 (arrow A1 of FIG. 1). The disk adaptor (DKA1) 62 then reads the write data 610 written in the cache memory 70 as such for writing into the logical volume (ORG1) 110 (S114, arrow A2 of FIG. 1).

On the other hand, the channel adaptor (CHA2) 61 forwards a write command and the journal data 950 to the channel port (P3) 50 of the second storage system 20 via the channel port (P2) 50 serving as an initiator (S115). The write command here is the one asking for writing of the write data 610 written in the cache memory 70 into the logical volume (Data1) 150, and the journal data 950 is the one configured by the update information 620 including the sequential number assigned thereto, and the write data 610.

The channel adaptor (CHA3) 61 of the second storage system 20 receives the write command and the journal data 950 via the channel port (P3) 50 serving as a target (S211). The channel adaptor (CHA3) 61 then accumulates the journal data 950 in the cache memory 70 (arrow A3 of FIG. 1), and the disk adaptor (DKA4) 62 reads the journal data 950 accumulated in the cache memory 70 for writing into the logical volume (JNL1) 151 (S212, arrow A4 of FIG. 1). In this embodiment, because the logical volume (Data1) 150 is virtual, the disk adaptor (DKA3) 62 executes no writing process with respect to the logical volume (Data1) 150. As such, without requiring the secondary logical volume to have any substantial storage capacity, the logical volume (Data1) 150 being virtual can be defined as the other end of the logical volume (ORG1) 110 for the remote copy.

After process completion of writing into the logical volume (JNL1) 151, the channel adaptor (CHA3) 61 forwards a notification of process completion to the channel port (P2) 50 of the first storage system 10 over the channel port (P3) 50 and the communications line 320 (S213).

When the channel adaptor (CHA2) 61 receives the notification of writing completion via the channel port (P2) 50, the channel adaptor (CHA1) 61 forwards the notification of writing completion to the host computer 41 via the channel port (P1) 50 and over the communications line 310 (S116).

Note that, in the above, remote copy is performed between the first and second storage systems 10 and 20 by synchronous transfer, i.e., synchronous copy. The synchronous copy in this embodiment is the process procedure in which when the first storage system 10 receives a data update request from the host computer 41, the corresponding data is transferred from the first storage system 10 to the second storage system 20, and when data update is completed in the second storage system 20, the data update is guaranteed as being completed in the first storage system 10. With synchronous copy as such between the first and second storage systems 10 and 20, the data image in the logical volume (ORG1) 110 is always macroscopically the same as that in the logical volume (Data1) 150. The expression "always macroscopically the same" means that during synchronous transfer of data, their data images may not always be the same in the units (μ second) of the data transfer time or the processing time for the storage systems 10 and 20, but are always the same at the point in time when the data update process is completed.

Figure 10:
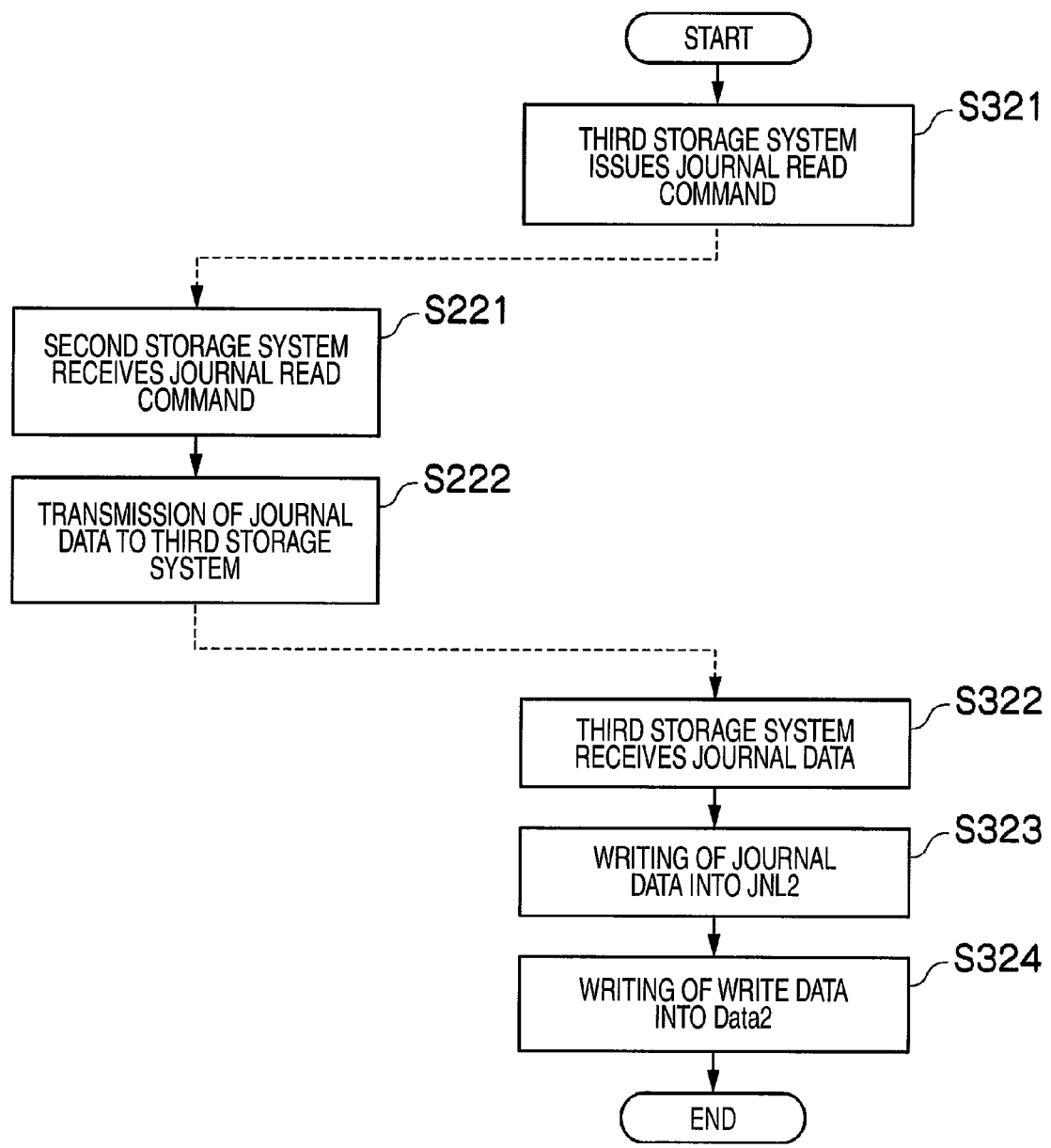
FIG. 10 is a flowchart of the operation related to remote copy between second and third sites.

FIG. 10 is a flowchart of the operation related to remote copy between the second and third sites. As shown in FIG. 10, the channel adaptor (CHA6) 61 of the third storage system 30 issues a journal read command at any arbitrary timing to ask for transfer of the journal data 950 (S321), and forwards the journal read command to the channel port (P5) 50 of the second storage system 20 via the channel port (P6) 50 serving as an initiator.

The channel adaptor (CHA5) 61 of the second storage system 20 receives the journal read command via the channel port (P5) 50 serving as a target (S221). The channel adaptor (CHA5) 61 then reads the journal data 950 accumulated in the cache memory 70, and forwards the journal data 950 to the channel port (P6) 50 of the third storage system 30 via the channel port (P5) 50 serving as an initiator (S222). Herein, the position for reading of the journal data 950 from the cache memory 70 is specified by a pointer. When the cache memory 70 carries no journal data 950, the disk adaptor (DKA4) may read the journal data 950 from the logical volume (JNL1) 151 for writing into the cache memory 70.

The channel adaptor (CHA6) 61 of the third storage system 30 receives the journal data 950 via the channel port (P6) 50 serving as a target (S322), and accumulates the journal data 950 in the cache memory 70 (arrow B1 of FIG. 1). The disk adaptor (DKA5) 62 reads the journal data 950 accumulated in the cache memory 70 for writing into the logical volume (JNL2) 201 (S323, arrow B2 of FIG. 1). The disk adaptor (DKA5) 62 reads the journal data 950 written in the logical volume (JNL2) 201, and writes the write data 610 into the cache memory 70 (arrow B3 of FIG. 1). The disk adaptor (DKA6) 62 reads the write data 610 written in the cache memory 70 for writing into the logical volume (Data2) 200 (S324, arrow B4 of FIG. 1). By keeping the journal data 950 as such in the logical volume (JNL2) 201, the write data 610 can be reflected to the logical volume (Data2) 200 at any appropriate timing in the third storage system 30. For example, when the sequential numbers are in order in the update information 620, the write data 610 may be written into the logical volume (Data2) 200, or when the load of the third storage system 30 is small, the write data 610 may be written into the logical volume (Data2) 200.

Note that, in the above, remote copy between the second and third storage systems 20 and 30 is performed by asynchronous transfer, i.e., asynchronous copy. The asynchronous copy in the embodiment is the process procedure in which when an update request is active for data from the first to second storage systems 10 to 20, the data is not transferred to the third storage system 30 but is transferred thereto in an asynchronous manner after completion of data update in the second storage system 20. That is, based on its own schedule, e.g., selectively when the processing load is small, the second storage system 20 performs data transfer to the third storage system 30 asynchronously with the data update request from the first storage system 10. With such asynchronous copy performed between the second and third storage systems 20 and 30, the data image of the logical volume (Data2) 200 will be the same as that of the logical volume (Data1) 150 at some time in the past, but will not necessarily be the same as the data image of the logical volume (Data1) 150 at this point in time.

For convenience of description, cascade configuration denotes a configuration in which one logical volume serves as a primary logical volume (P-VOL) in a pair but as a secondary logical volume (S-VOL) in another pair. In this embodiment, as shown in FIG. 1, such a cascade configuration is designed with respect to the logical volume (Data1) 150 of the second storage system 20. For designing the cascade configuration as such with respect to the logical volume (Data1) 150 being virtual, if a pair is established with the logical volume (Data1) 150 serving as a secondary logical volume (S-VOL) before a pair is established therewith serving as a primary logical volume (P-VOL), the second storage system 20 will have no writing destination for the write data 610 because the logical volume (Data1) 150 is not a real volume. Moreover, because no pair is established between the logical volumes of the second and third storage systems, when the logical volume (ORG1) 110 of the first storage system 10 is updated in data, such data update cannot be reflected to the logical volume (Data2) 200 of the third storage system 30. Accordingly, for designing the cascade configuration with respect to any virtual volume, there needs to be established a pair with the virtual volume serving as a secondary logical volume (S-VOL) after a pair is established with the virtual volume serving as a primary logical volume (P-VOL).

Figure 11:
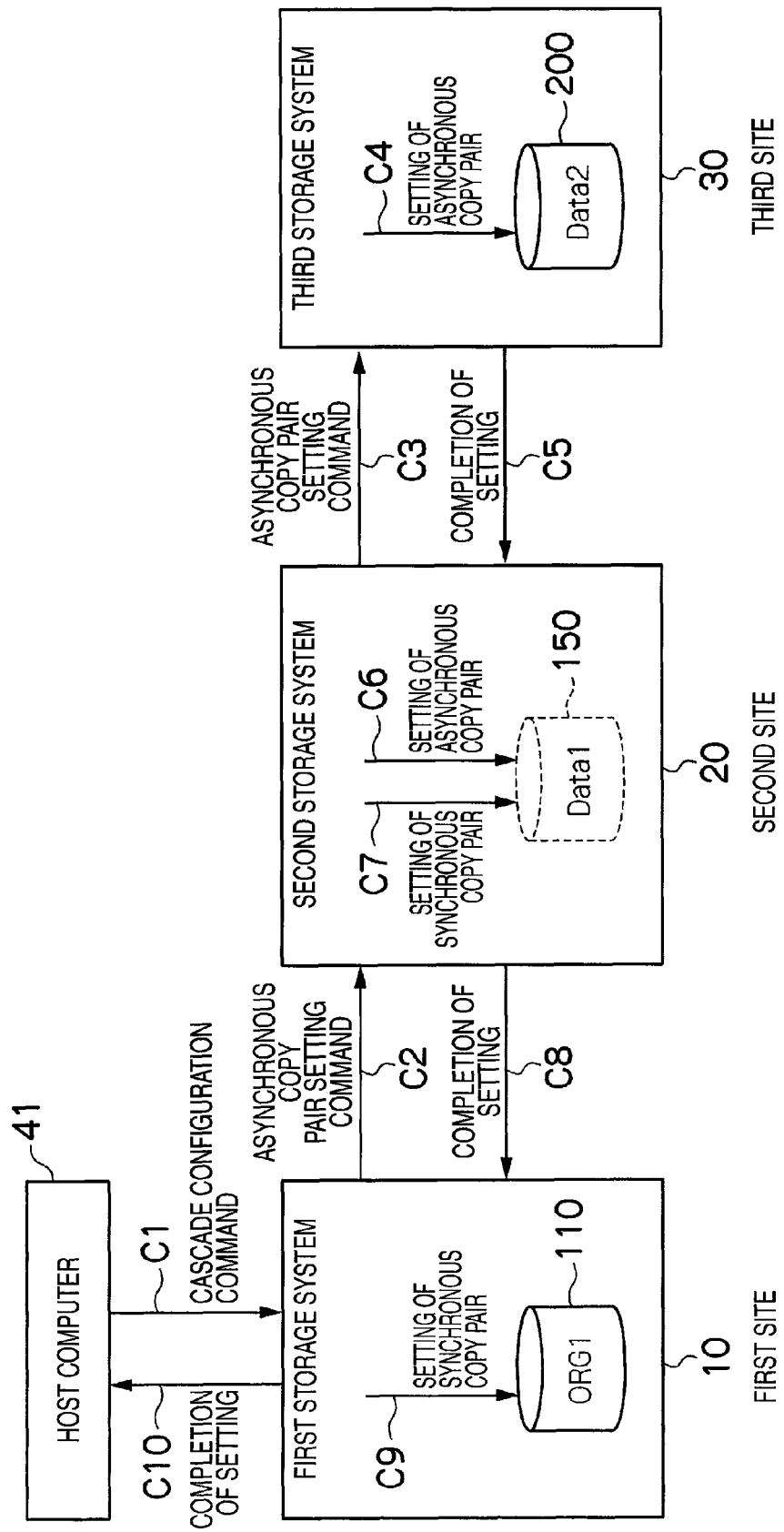
FIG. 11 is a block diagram for illustrating the outline of a cascade configuration process.

By referring to FIGS. 11 to 22, described next is the operation of pair setting, i.e., the cascade configuration process, for execution of the data update process described above. This process is of establishing a pair between the logical volume (ORG1) 110 of the first storage system 10 and the logical volume (Data1) 150 of the second storage system 20, and a pair between the logical volume (Data1) 150 of the second storage system 20 and the logical volume (Data2) 200 of the third storage system 30. FIG. 11 is a block diagram for illustrating the outline of the cascade configuration process. Note that any similar components are provided with the same reference numerals, and not described in detail again.

As shown in FIG. 11, upon reception of a cascade configuration command from the host computer 41, i.e., setting request of first and second pairs (arrow C1), the first storage system 10 issues an asynchronous copy pair setting command C2 to the second storage system 20 (arrow C2) for setting of a pair between the logical volume (Data1) 150 of the second storage system 20 being virtual and the logical volume (Data2) 200 of the third storage system 30. In the pair, the logical volume (Data1) 150 is the primary logical volume (P-VOL), and the logical volume (Data2) 200 is the secondary logical volume (S-VOL). Such a pair is hereinafter referred to as an asynchronous copy pair.

After receiving such an asynchronous pair setting request, the second storage system 20 transfers a similar request to the third storage system 30 (arrow C3), and the third storage system 30 sets an asynchronous copy pair to the logical volume (Data2) 200 (arrow C4). After the setting of the asynchronous copy pair as such, the third storage system 30 notifies the second storage system 20 of completion of pair setting (arrow C5).

After receiving the notification of pair setting completion, the second storage system 20 sets the asynchronous copy pair to the logical volume (Data1) 150 (arrow C6). After the setting of the asynchronous copy pair as such, the second storage system 20 sets another pair to the logical volume (Data1) 150 (arrow C7), i.e., a pair between the logical volume (ORG1) 110 of the first storage system 10 (primary logical volume (P-VOL)) and the logical volume (Data1) 150 of the second storage system 20 being virtual (secondary logical volume (S-VOL)). Hereinafter, such a pair is referred to as a synchronous copy pair. After the setting of the synchronous copy pair as such, the second storage system 20 forwards a notification of setting completion to the first storage system 10 (arrow C8).

Upon reception of the notification of setting completion, the first storage system 10 sets the synchronous copy pair to the logical volume (ORG1) 110 (arrow C9). After the setting of the synchronous copy pair as such, the first storage system 10 forwards a notification of setting completion to the host computer 41 (arrow C10). As such, a one-time cascade configuration command can set a synchronous copy pair and an asynchronous copy pair in the appropriate order. Accordingly, in the remote copy system using a virtual volume in a site located in the middle of any other sites, i.e., the second site, the environment of being able to prevent any data backup failure can be established with ease.

Figure 12:
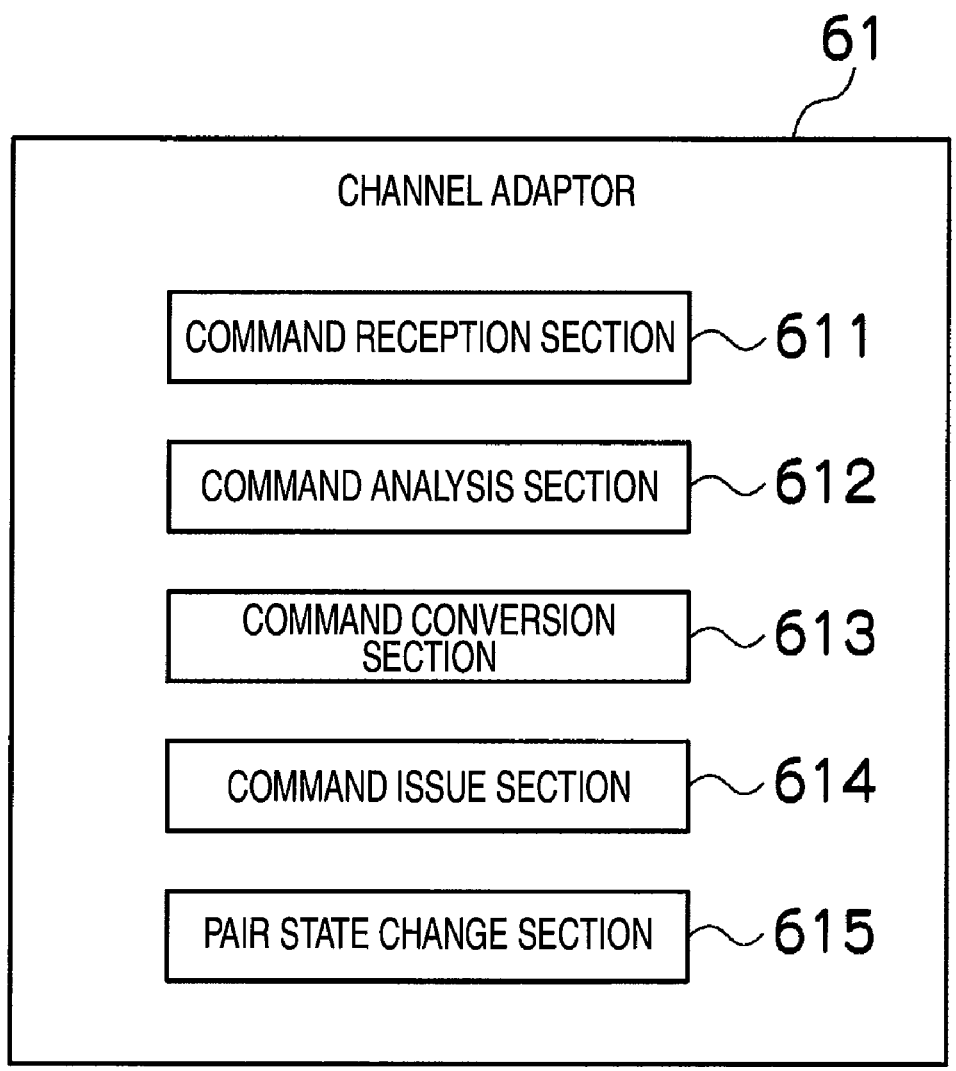
FIG. 12 is a block diagram for illustrating the software configuration related to a pair setting of channel adaptors of FIG. 2.

In the below, by referring to FIGS. 12 to 21, the cascade configuration process is described more in detail. FIG. 12 is a block diagram for illustrating the software configuration related to pair setting of the channel adaptors 61 of FIG. 2.

The process details related to the pair setting of the channel adaptors 61 are classified by function, i.e., a command reception section 611, a command analysis section 612, a command conversion section 613, a command issue section 614, and a pair state change section 615. The command reception section 611 receives a command from outside, and the command analysis section 612 analyzes the command received by the command reception section 611. Based on the analysis result of the command analysis section 612, the command conversion section 613 generates a new command or others from the received command, and the command issue section 614 forwards thus generated command or others. Also based on the analysis result of the command analysis section 612, the pair state change section 615 changes the state of the corresponding pair.

By referring to FIG. 12, described is the software configuration of the channel adaptors 61 of the first storage system 10. The channel adaptors 61 in the second and third storage systems 20 and 30 are also almost in the same software configuration, and thus are not described twice.

Figure 13:
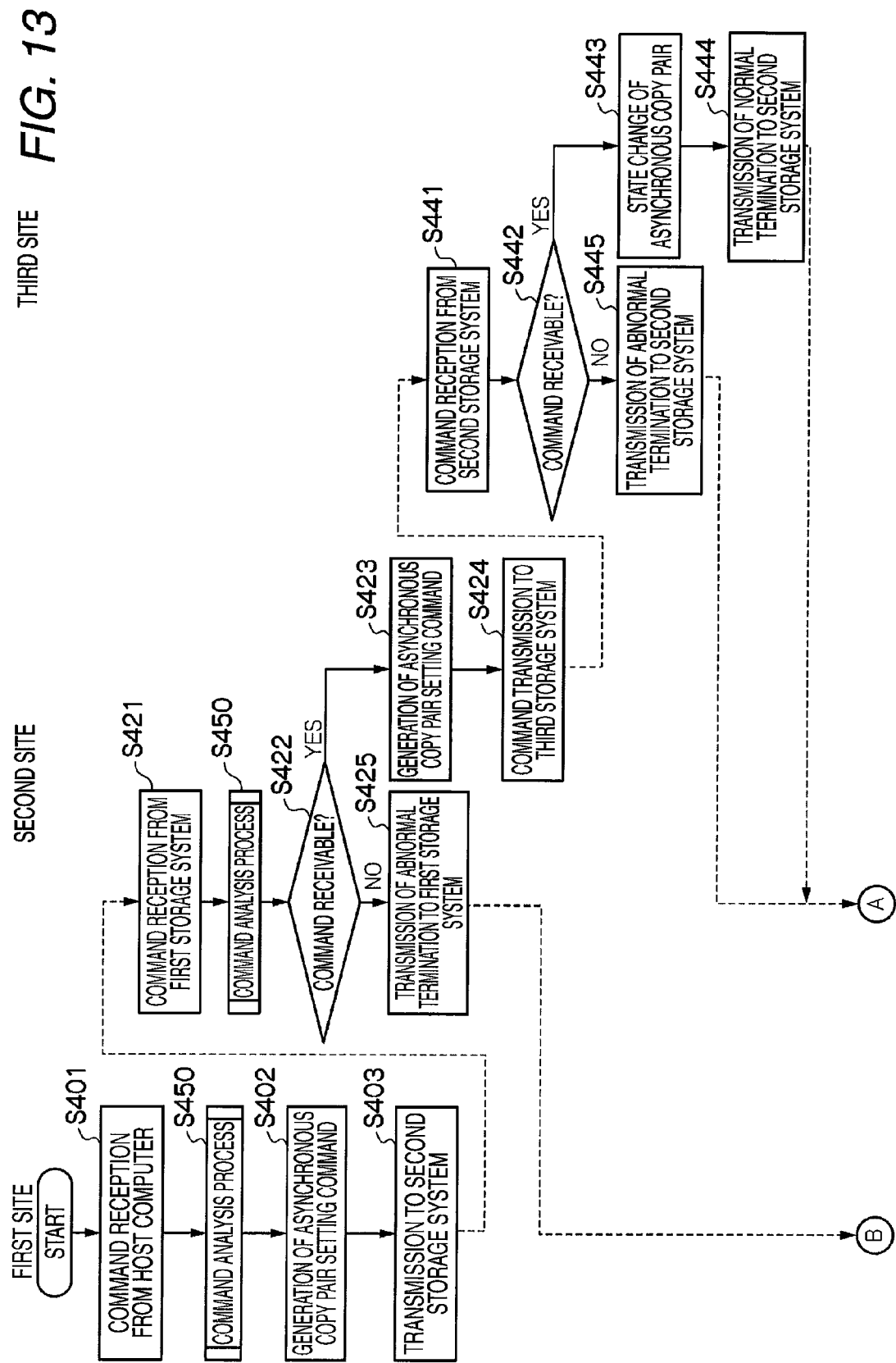
FIG. 13 is a flowchart of the cascade configuration process.
Figure 14:
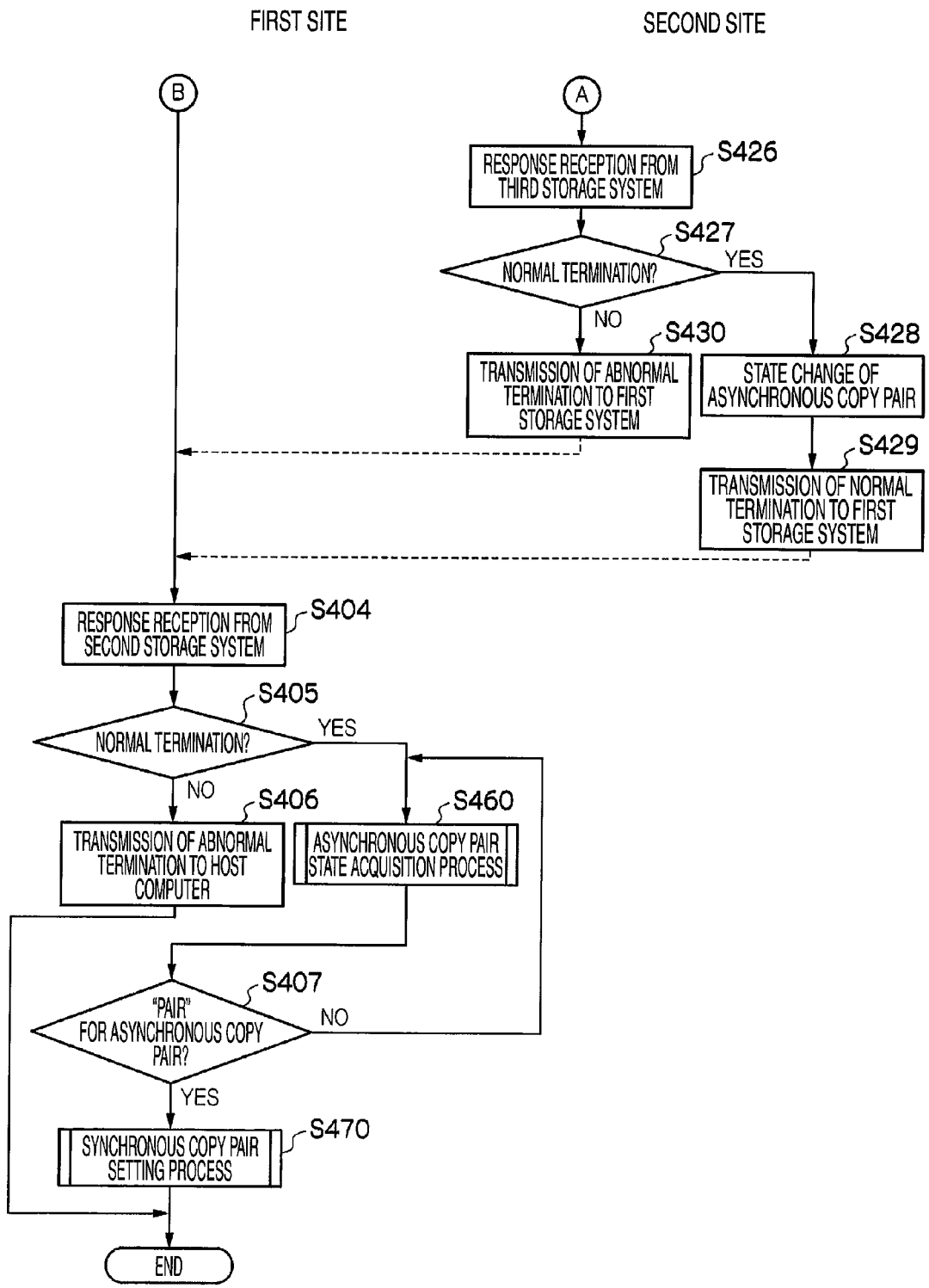
FIG. 14 is another flowchart of the cascade configuration process.

FIGS. 13 and 14 are each a flowchart of the cascade configuration process. As shown in FIG. 13, when the host computer 41 issues a cascade configuration command, the command reception section 611 of the first storage system 10 receives a cascade configuration command 701 from the host computer 41 (S401).

Described now is the cascade configuration command 701. FIG. 15 is a configuration diagram for illustrating the data format of the cascade configuration command. Such a cascade configuration command 701 is configured to include a command code field 701A, a with/without cascade configuration command field 701B, a second storage system serial number field 701C, a cascade-configuration-command-receiving logical volume number field 701D, an asynchronous-copy-pair primary logical volume number field 701E, an asynchronous-copy-pair secondary logical volume number field 701F, a third-storage-system serial number field 701G, a third-storage-system subsystem ID field 701H, a copy mode field 701I, and an error level field 701J.

The command code field 701A stores codes each indicating the command type, and for the cascade configuration command 701, "FFFF" is stored, for example. The with/without cascade configuration command field 701B stores numbers indicating whether the cascade configuration command 701 is provided or not, e.g., "1" when the command is provided, and "0" when not provided. The second-storage-system serial number field 701C stores the manufacturing number of the second storage system 20. The cascade-con-figuration-command-receiving logical volume number field 701D stores the number of the logical volume to be provided with the cascade configuration command in the second storage system 20. At this point in time, i.e., at the point in time when the host computer 41 issues the command, the logical volume number for receiving the cascade configuration command is yet unknown. Therefore, any logical volume number not yet defined (not defined) in the second storage system 20 is defined as a command receiving logical volume, and "100F" is stored therefor, for example.

The asynchronous-copy-pair primary logical volume number field 701E stores numbers of primary logical volumes (P-VOL) of any asynchronous copy pairs. The asynchronous-copy-pair secondary logical volume number field 701F stores numbers of secondary logical volumes (S-VOL) of any asynchronous copy pairs. The third-storage-system serial number field 701G stores the manufacturing number of the third storage system 30. The third-storage-system subsystem ID field 701H stores an ID assigned to the third storage system 30 depending on the device type thereof. The copy mode field 701I stores copy types of pairs to be set, e.g., "no copy" indicates copying of no data, "all copy" indicates copying of every data, and "differential copy" indicates copying only of differential data referring to differential bits or others, for example. The error level field 701J stores the range of failure (error) influence when any failure (error) occurs, e.g., "logical volume" and "journal group". When any failure occurs in the cascade configuration command 701, the system stops or recovers in accordance with the range stored in the error level field 701J.

The command analysis section 612 then executes a command analysis process (will be described later) for analysis of any received command (S450). Based on the process result of the command analysis process S450, the command conversion section 613 generates an asynchronous copy pair setting command 702 from the received cascade configuration command 701 (S402), and the command issue section 614 forwards the thus generated asynchronous copy pair setting command 702 to the second storage system 20 (S403).

Described now is the asynchronous copy pair setting command 702. FIG. 16 is a configuration diagram for illustrating the data format of an asynchronous copy pair setting command. The asynchronous copy pair setting command 702 is configured to include a command code field 702A, a cascade-configuration-command logical volume number field 702B, a second-storage-system serial number field 702C, a second-storage-system subsystem ID field 702D, an asynchronous-copy-pair primary logical volume number field 702E, a third-storage-system serial number field 702F, a third-storage-system subsystem ID field 702G, an asynchronous-copy-pair secondary logical volume number field 702H, a copy mode field 702I, and an error level field 702J.

The fields, i.e., the command code field 702A, the second-storage-system serial number field 702C, the asynchronous-copy-pair primary logical volume number field 702E, the third-storage-system serial number field 702F, the third-storage-system subsystem ID field 702G, the asynchronous-copy-pair secondary logical volume number field 702H, the copy mode field 702I, and the error level field 702J, are the same as those in the cascade configuration command 701 described above, and thus are not described again.

The cascade-configuration-command logical volume number field 702B stores the number of the logical volume to be provided with the cascade configuration command in the second storage system 20. The second storage system subsystem ID field 702D stores an ID assigned to the second storage system 20 depending on the device type thereof.

The command reception section 611 of the second storage system 20 receives an asynchronous copy pair setting command 702 from the first storage system 10 (S421). The command analysis section 612 executes the command analysis process that will be described later (S450). Thereafter, the command analysis section 612 reads, from the volume information table 400 in the shared memory 80, any line (record) of the logical volume number field 400A storing a number the same as that of the asynchronous-copy-pair primary logical volume number field 702E. Based on the volume state field 400B of the line (record) read as such, the command analysis section 612 determines whether the asynchronous copy pair setting command 702 can be received or not (S422). To be specific, when the volume state field 400B of the line (record) is showing "normal", the determination result is YES, i.e., the command can be received, and when not showing "normal", the determination result is NO, i.e., the command cannot be received.

When the determination result in step S422 is YES, i.e., the asynchronous copy pair setting command 702 can be received, the command conversion section 613 generates an asynchronous copy pair setting command 703 from the asynchronous copy pair setting command 702 (S423), and the command issue section 614 forwards the thus generated asynchronous copy pair setting command 703 to the third storage system 30 (S424). On the other hand, when the determination result is NO, i.e., the asynchronous copy pair setting command 702 cannot be received, the command issue section 614 forwards a notification of abnormal termination to the first storage system 10 (S425).

Figure 17:
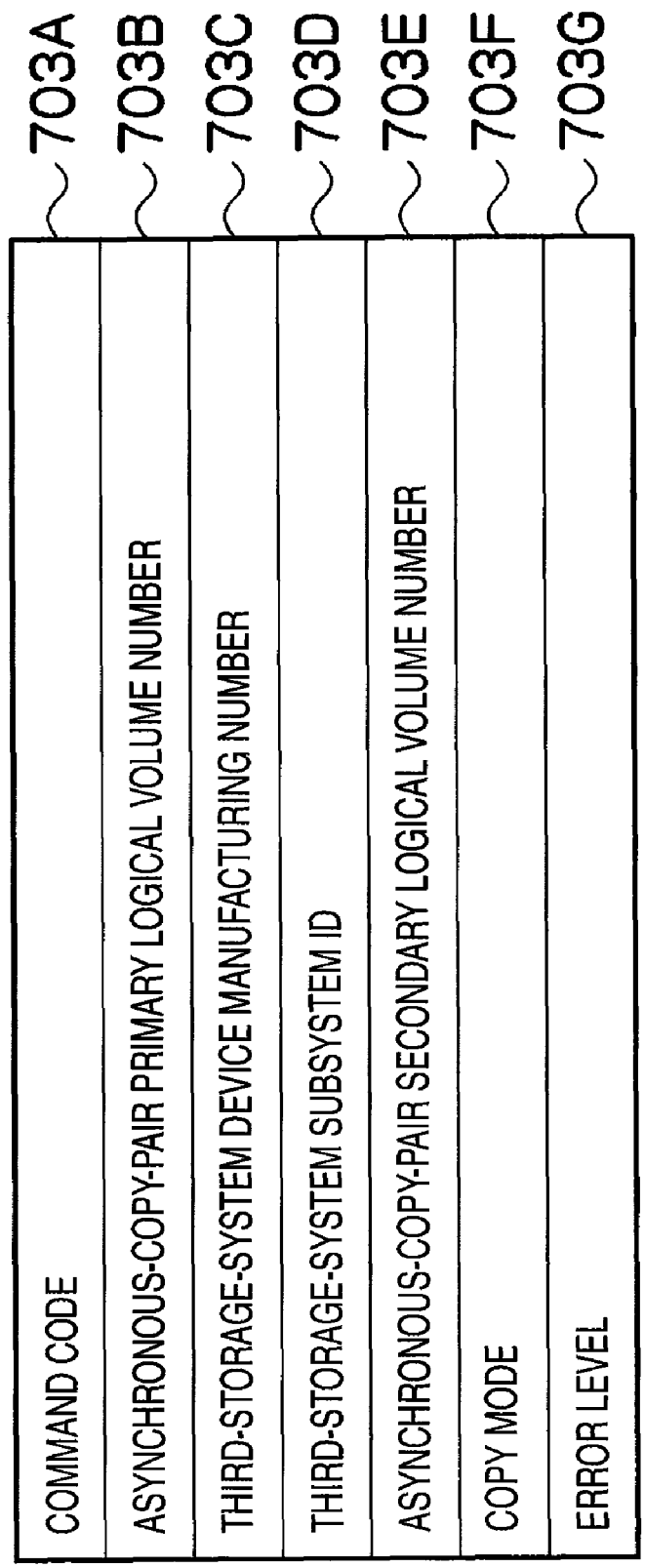
FIG. 17 is another configuration diagram for illustrating the data format of an asynchronous copy pair setting command.

Described now is the asynchronous copy pair setting command 703. FIG. 17 is a configuration diagram for illustrating the data format of an asynchronous copy pair setting command. The asynchronous copy pair setting command 703 is configured to include a command code field 703A, an asynchronous-copy-pair primary logical volume number field 703B, a third-storage-system serial number field 703C, a third-storage-system subsystem ID field 703D, an asynchronous copy pair secondary logical volume number field 703E, a copy mode field 703F, and an error level field 703G. The fields 703A to 703G are the same as those in the asynchronous copy pair setting command 701 described above, and thus are not described again.

The command reception section 611 of the third storage system 30 receives the asynchronous copy pair setting command 703 from the second storage system 20 (S441). The command analysis section 612 reads, from the volume information table 400 in the shared memory 80, any line (record) of the logical volume number field 400A storing a number same as that of the asynchronous copy pair secondary logical volume number field 703E. Based on the volume state field 400B of the line (record) read as such, the command analysis section 612 determines whether the asynchronous copy pair setting command 703 can be received or not (S442). To be specific, when the volume state field 400B of the line (record) is showing "normal", the determination result is YES, i.e., the command can be received, and when not showing "normal", the determination result is NO, i.e., the command cannot be received.

When the determination result in step S442 is YES, i.e., the asynchronous copy pair setting command 703 can be received, the pair state change section 615 reads, from the pair management table 500 in the shared memory 80, any line (record) of the self logical volume number field 500A storing a number the same as that of the asynchronous copy pair secondary logical volume number field 703E. The pair state change section 615 changes the pair state field 500F for the line (record), and writes the change to the pair management table 500 in the shared memory 80 (S443). To be specific, the pair state field 500F is changed from "SMPL" to "COPY". In response thereto, the setting of an asynchronous copy pair is started. After such a change of the pair state field 500F, the command issue section 614 forwards a notification of normal termination to the second storage system 20 (S444). On the other hand, when the determination result is NO, i.e., the asynchronous copy pair setting command 703 cannot be received, the command issue section 614 forwards a notification of abnormal termination to the second storage system 20 (S445).

Figure 18:
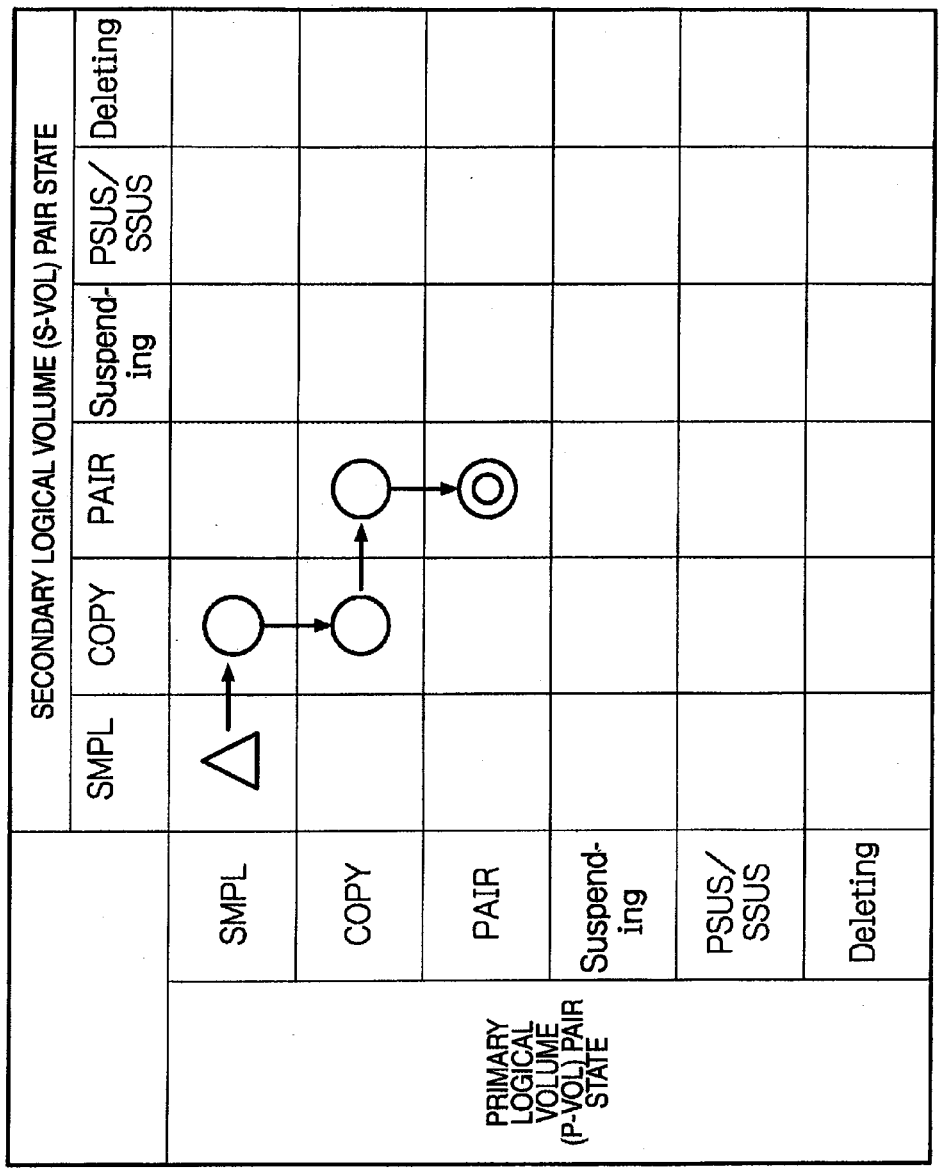
FIG. 18 is a state transition diagram of an asynchronous copy pair.

Described now is the state of an asynchronous copy pair. FIG. 18 is a diagram showing the state transition of an asynchronous copy pair. In the drawing, "SMPL" indicates that the logical volume is not in the asynchronous copy pair, "COPY" indicates that the logical volume is in a copy process, i.e., no complete data matching is yet achieved, and "PAIR" indicates that the complete data matching is achieved with the copy process completed, "Suspending" indicates the transient state to "P-SUS/S-SUS", "P-SUS/S-SUS" indicates that the copy process is being suspended, and "Deleting" indicates the transient state to "SMPL". When the host computer 41 issues a pair setting command, the primary logical volume (P-VOL) and the secondary logical volume (S-VOL) both show the pair state of "SMPL" (triangle mark in FIG. 18). In the process of S443, when the pair state field 500F is changed from "SMPL" to "COPY", the pair state of the primary logical volume (P-VOL) is changed to "SMPL", and the pair state of the secondary logical volume (S-VOL) to "COPY".

As shown in FIG. 14, the command reception section 611 of the second storage system 20 receives a response from the third storage system 30 (S426). The command analysis section 612 determines whether the response from the third storage system 30 is notifying normal termination or not (S427). When the response from the third storage system 30 is notifying normal termination, the pair state change section 615 reads, from the pair management table 500 in the shared memory 80, any line (record) of the self logical volume number field 500A storing a number the same as that of the asynchronous-copy-pair primary logical volume number field 702E, and storing "primary" in the self volume attribute field 500B. The pair state change section 615 then changes the pair state field 500F for the line (record), and writes the change into the pair management table 500 in the shared memory 80 (S428). To be specific, the pair state field 500F is changed from "SMPL" to "COPY". As a result, the setting of an asynchronous copy pair is started.

After the pair state field 500F is changed as such, the command issue section 614 forwards a notification of normal termination to the first storage system 10 (S429). On the other hand, when the response from the third storage system 30 is not notifying normal termination, i.e., abnormal termination, the command issue section 614 forwards a notification of abnormal termination to the first storage system 10 (S430).

In the process of S428, when the pair state field 500F is changed from "SMPL" to "COPY", in the pair state of FIG. 18, both the primary logical volume (P-VOL) and the secondary logical volume (S-VOL) show "COPY". As such, after the secondary logical volume (S-VOL) is changed in pair state, the primary logical volume (P-VOL) is changed in pair state, thereby enabling the storage system keeping the primary logical volume (P-VOL) to determine the pair state.

When the pair state field 500F is changed from "SMPL" to "COPY", it means that the setting of an asynchronous copy pair is completed, and thus a copy process is started from the logical volume (Data1) 150 of the second storage system 20 being the primary logical volume (P-VOL) to the logical volume (Data2) 200 of the third storage system 30 being the secondary logical volume (S-VOL). When the copy process is completed, the pair state change section 615 of the third storage system 30 first changes the pair state of the secondary logical volume (S-VOL) to "PAIR", and then the pair state change section 615 of the second storage system 20 changes the pair state of the primary logical volume (P-VOL) to "PAIR". When the primary logical volume (P-VOL) and the secondary logical volume (S-VOL) are both changed to "PAIR" (double circle of FIG. 18), it means that the complete data matching is achieved for the pair.

The command reception section 611 of the first storage system 10 receives a response from the second storage system 20 (S404). The command analysis section 612 determines whether the response from the second storage system 20 is notifying normal termination or not (S405). When the response from the second storage system 20 is notifying normal termination, an asynchronous copy pair state acquisition process (will be described later) is executed to acquire the pair state of the asynchronous copy pair (S460). On the other hand, when the response from the second storage system 20 is not notifying normal termination, i.e., abnormal termination, the command issue section 614 forwards the notification of abnormal termination to the host computer 41 (S406), and the first storage system 10 ends the process.

After executing the asynchronous copy pair state acquisition process S460, the command analysis section 612 determines whether the pair state of thus acquired asynchronous copy pair shows "PAIR" or not (S407). When the determination result is NO, the command analysis section 612 repeats the asynchronous copy pair state acquisition process S460 until the asynchronous copy pair shows the pair state of "PAIR". When the determination in step S407 becomes YES, i.e., the asynchronous copy pair shows the pair state of "PAIR", a synchronous copy pair setting process (will be described later) is executed for setting of a synchronous copy pair (S470), and the first storage system 10 ends the process. As such, in the state that the complete data matching is achieved between the logical volume (Data1) 150 of the second storage system 20 and the logical volume (Data2) 200 of the third storage system 30, the setting of a synchronous copy pair is started so that the write data 610 written into the logical volume (ORG1) 110 can be entirely reflected to the logical volume (Data2) 200 of the third storage system.

Figure 19:
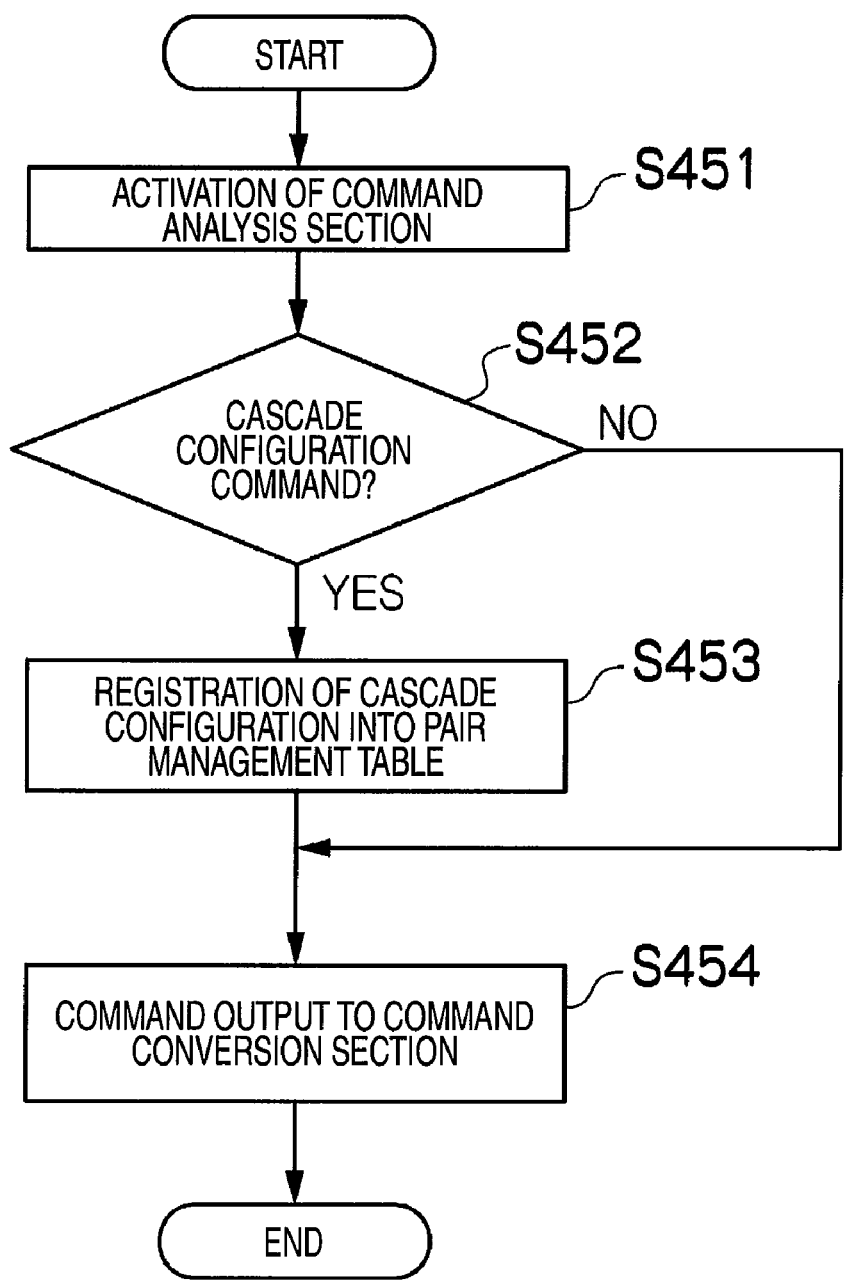
FIG. 19 is a flowchart of a command analysis process.

FIG. 19 is a flowchart of the command analysis process. As shown in FIG. 19, when the command reception section 611 receives a command, the command analysis section 612 is activated by the command reception section 611 (S451). The command analysis section 612 then determines whether or not the received command is a cascade configuration command (S452). Such a determination is made based on the command code fields 701A, 702A, and 703A, the with/without cascade configuration command field 701B, and others.

When the determination result in S452 is YES, i.e., when the received command is the cascade configuration command, the command analysis section 612 reads, from the pair management table 500 in the shared memory 80, any line (record) of the other-end logical volume number field 500G storing a number the same as the number of the secondary logical volume (S-VOL) specified by the command, and storing "virtual" in the other-end virtual volume information field 500I. The command analysis section 612 then registers "cascade" to the pair operation command information field 500J of the line (record) for writing into the pair management table 500 of the shared memory 80 (S453). As such, by referring to the pair operation command information field 500J of the pair management table 500, the command conversion section 613 of the first storage system 10 can generate the asynchronous copy pair command 702 and the synchronous copy pair command.

Thereafter, the command analysis section 612 outputs a command corresponding to the received command to the command conversion section 613 (S454). The command analysis section 612 then ends the command analysis process S450. On the other hand, when the received command is not the pair setting command, the procedure skips the process of S453 and goes to the process of S454, and the command analysis section 612 ends the command analysis process S450.

Figure 20:
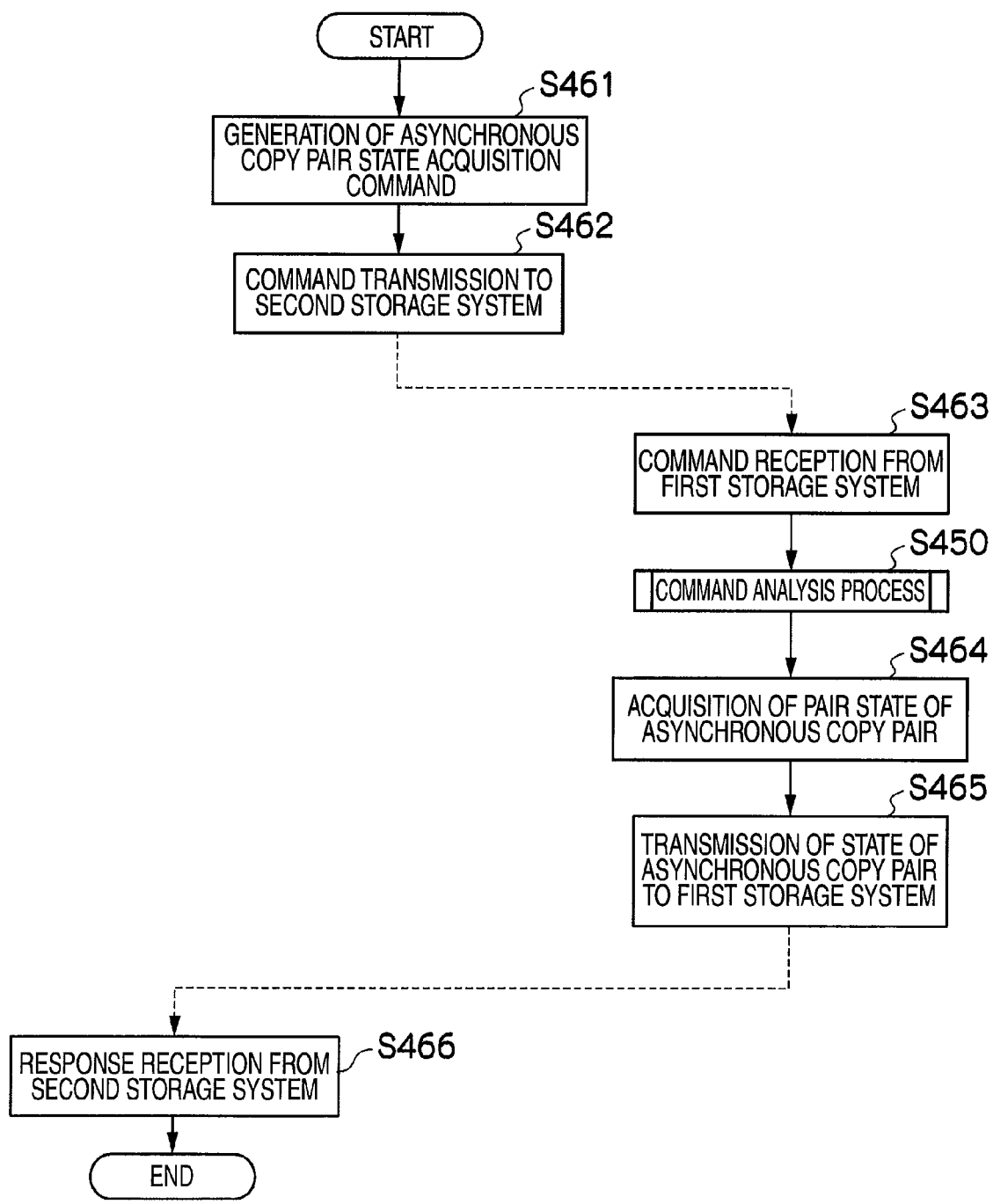
FIG. 20 is a flowchart of an asynchronous copy pair state acquisition process.

FIG. 20 is a flowchart of the asynchronous copy pair state acquisition process. As shown in FIG. 20, the command conversion section 613 of the first storage system 10 generates an asynchronous copy pair state acquisition command based on the cascade configuration command 701 provided by the host computer 41 (S461), and the command issue section 614 forwards thus generated asynchronous copy pair state acquisition command to the second storage system 20 (S462).

The command reception section 611 of the second storage system 20 receives the asynchronous copy pair state acquisition command from the first storage system 10 (S463). The command analysis section 612 executes the command analysis process (S450), and the command analysis section 612 then reads, from the pair management table 500 in the shared memory 80, any line (record) of the self logical volume number field 500A storing a number the same as that of the primary logical volume (P-VOL) specified by the asynchronous copy pair state acquisition command, for example, and acquires information stored in the pair state field 500F of the line (record) (S464). Herein, when the asynchronous copy pair state acquisition process S460 is started, because the copy process is started after completion of the setting of the asynchronous copy pair, the information to be acquired is generally "COPY" or "PAIR". The command issue section 614 then forwards thus acquired asynchronous copy pair state to the first storage system 10 (S465).

The command reception section 611 of the first storage system 10 receives the asynchronous copy pair state from the second storage system 20 (S466), and the first storage system 10 ends the asynchronous copy pair state acquisition process S460.

Figure 21:
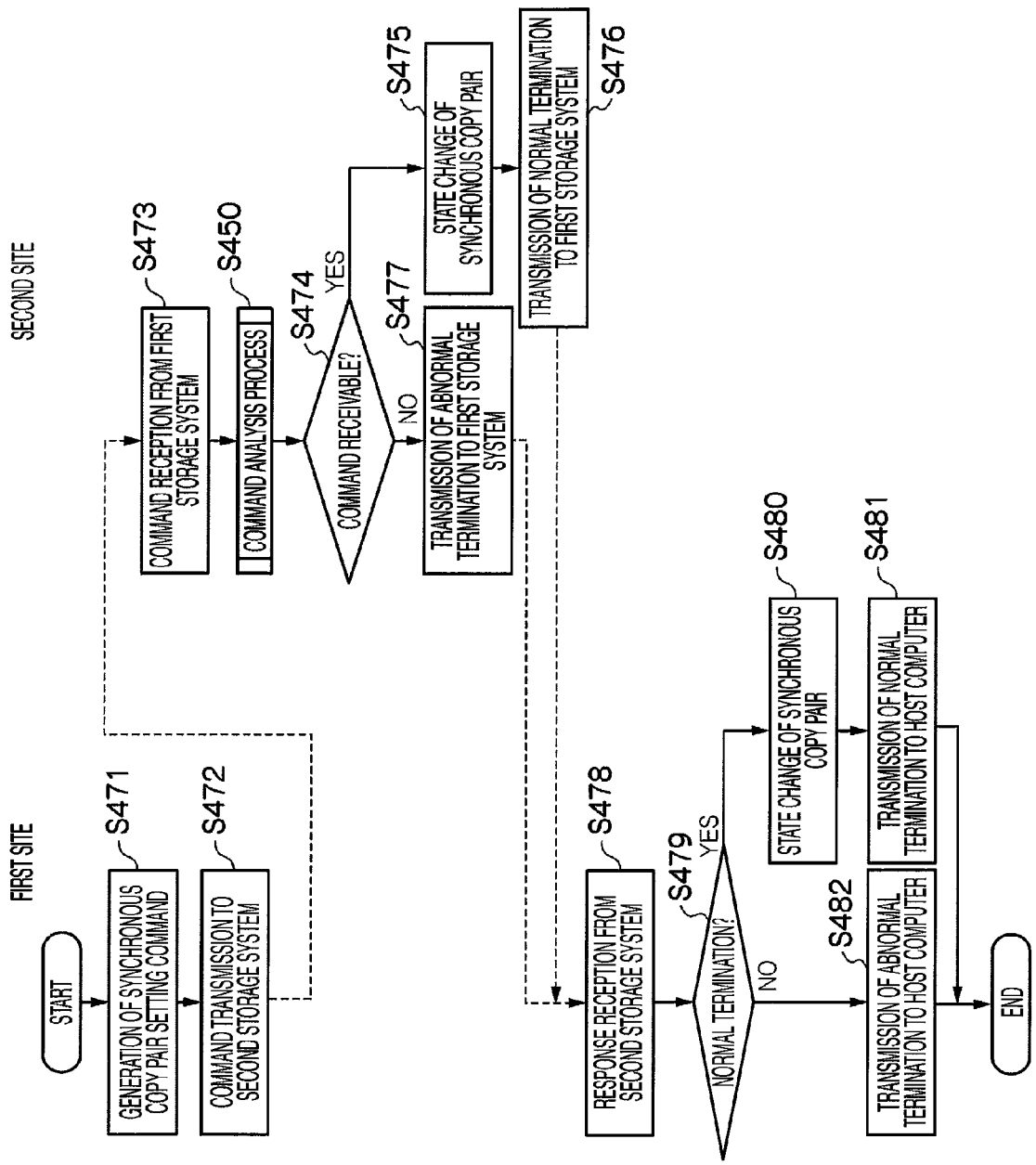
FIG. 21 is a flowchart of a synchronous copy pair setting process.

FIG. 21 is a flowchart of the synchronous copy pair setting process. As shown in FIG. 21, the command conversion section 613 of the first storage system 10 generates a synchronous copy pair setting command based on a command provided by the host computer 41 (S471), and the command issue section 614 then forwards thus generated synchronous copy pair setting command to the second storage system 20 (S472).

The command reception section 611 of the second storage system 20 receives the synchronous copy pair setting command from the first storage system 10 (S473). The command analysis section 612 reads, from the volume information table 400 of the shared memory 80, any line (record) of the logical volume number field 400A storing a number the same as that of the secondary logical volume (S-VOL) specified by the synchronous copy pair setting command, for example. Based on the volume state field 400B of the line (record) read as such, the command analysis section 612 then determines whether the synchronous copy pair setting command can be received or not (S474). To be specific, when the volume state field 400B of the line (record) is showing "normal", the determination result is YES, i.e., the command can be received, and when not showing "normal", the determination result is NO, i.e., the command cannot be received.

When the determination result in S474 is YES, i.e., the synchronous copy pair setting command can be received, the pair state change section 615 reads, from the pair management table 500 in the shared memory 80, any line (record) of the self logical volume number field 500A storing a number the same as that of the secondary logical volume (S-VOL) specified by the synchronous copy pair setting command, and storing "secondary" in the self volume attribute field 500B, for example. The pair state change section 615 then changes the pair state field 500F of the line (record) for writing to the pair management table 500 in the shared memory 80 (S475). To be specific, the pair state field 500F is changed from "SMPL" to "COPY". As a result, the setting of a synchronous copy pair is started. After the pair state field 500F is changed as such, the command issue section 614 forwards a notification of normal termination to the first storage system 10 (S476). On the other hand, when the determination in S474 is NO, i.e., the synchronous copy pair setting command cannot be received, the command issue section 614 forwards a notification of abnormal termination to the first storage system 10 (S477).

The command reception section 611 of the first storage system 10 receives a response from the second storage system 20 (S478). The command analysis section 612 then determines whether the response from the second storage system 20 is notifying normal termination or not (S479), and when the response from the second storage system 20 is notifying normal termination, the pair state change section 615 reads, from the pair management table 500 in the shared memory 80, any line (record) of the self logical volume number field 500A storing a number the same as that of the primary logical volume (P-VOL) specified by the synchronous copy pair command. The pair state change section 615 then changes the pair state field 500F of the line (record) for writing to the pair management table 500 in the shared memory 80 (S480). To be specific, the pair state field 500F is changed from "SMPL" to "COPY". As a result, the setting of a synchronous copy pair is completed. At this time, a copy process is started from the logical volume (ORG1) 110 of the first storage system 10 being the primary logical volume (P-VOL) to the logical volume (Data1) 150 of the second storage system 20 being the secondary logical volume (S-VOL).

After the pair state field 500F is changed as such, the command issue section 614 forwards a notification of normal termination to the host computer 41 (S481), and the first storage system 10 ends the synchronous copy pair setting process S470. On the other hand, when the response from the second storage system 20 is not notifying normal termination, i.e., abnormal termination, the command issue section 614 forwards a notification of abnormal termination to the host computer 41 (S482), and the first storage system 10 ends the synchronous copy pair setting process S470.

Note here that the copy process for a synchronous copy pair is completed in a very short time compared with an asynchronous copy pair, and is changed into "PAIR". Therefore, after the synchronous copy pair is changed in pair state to "COPY", the first storage system 10 may forward a notification of normal termination to the host computer 41 without confirming the change of pair state to "PAIR".

In this embodiment, in the procedure of copy pair setting, after the setting of an asynchronous copy pair is completed, the setting of a synchronous copy pair is started. This is surely not the only case, and can be also applied to the procedure of resynchronization. For resynchronizing the data of the primary logical volume (P-VOL) by the data of the secondary logical volume (S-VOL), preferably, a synchronous copy pair is resynchronized after an asynchronous copy pair is resynchronized. This accordingly enables resynchronization in an appropriate order, thereby favorably achieving complete resynchronization.

In the procedure of copy pair suspension, conversely, preferably, an asynchronous copy pair is suspended after a synchronous copy pair is suspended. This accordingly enables the remote copy to be suspended in an appropriate order.

Figure 22:
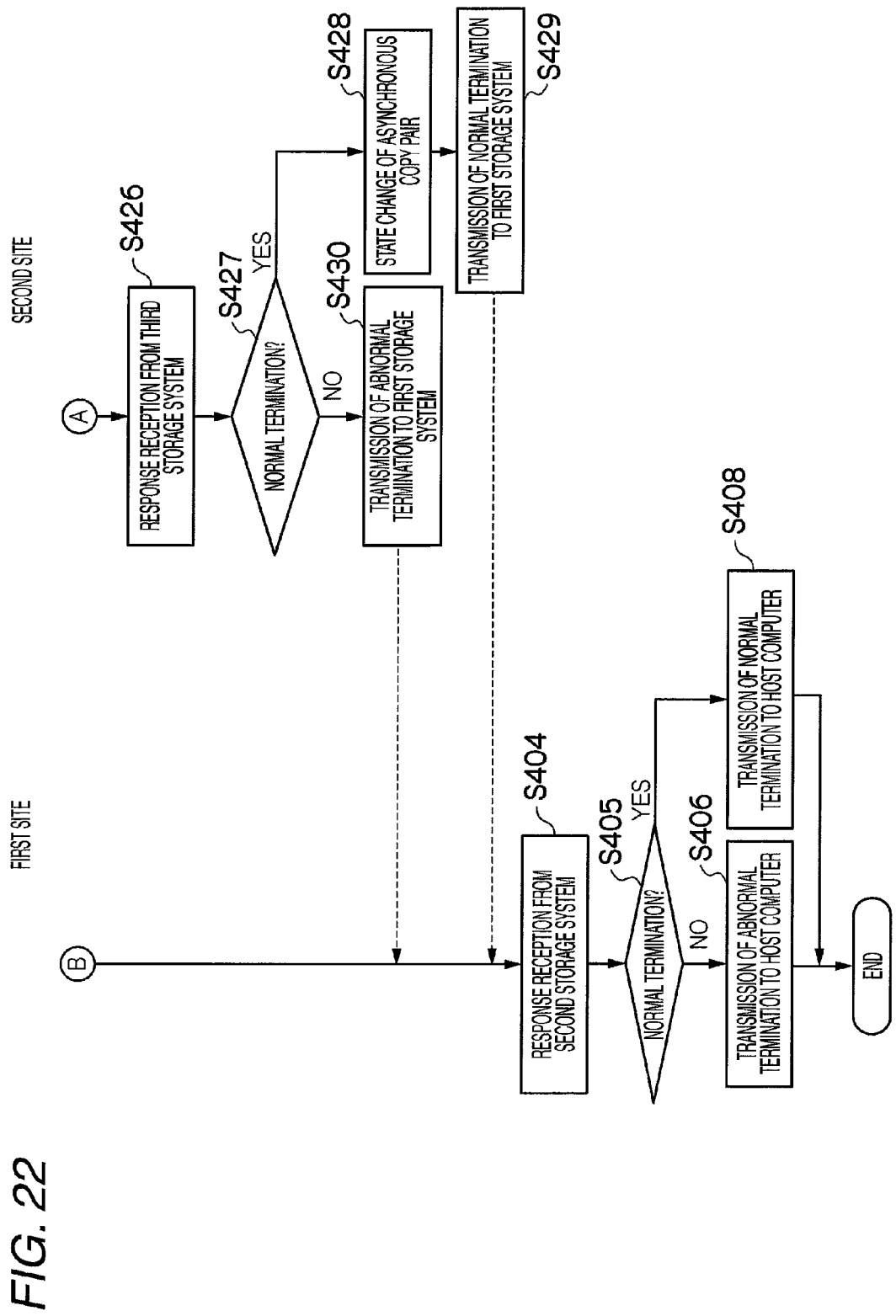
FIG. 22 is a flowchart of an asynchronous copy pair command process.

Note that, in the remote copy system 100, when the host computer 41 issues an asynchronous copy pair setting command for setting of only an asynchronous copy pair, the process will be almost the same as the cascade configuration process described above. FIG. 22 is a flowchart of an asynchronous copy pair command process. Note here that any similar components are provided with the same reference numerals, and not described again.

As shown in FIG. 22, the procedure from the start to the process of S405 is the same as that of the cascade configuration process described above. When the determination result in S405 is YES, i.e., the response from the second storage system 20 is notifying normal termination, the command issue section 614 forwards a notification of normal termination to the host computer 41 without executing the asynchronous copy pair state acquisition process S460 (S408). The first storage system 10 then ends the process. As such, even if only a synchronous copy pair is set by the synchronous copy pair setting process of FIG. 21 or others after only an asynchronous copy pair is set by the asynchronous copy pair command process of FIG. 22, the cascade configuration can be designed.

Second Embodiment

By referring to FIGS. 23 to 27, described next is a second embodiment of the invention. The second embodiment is different from the first embodiment in the respect that the host computer is so configured as to display a predetermined screen when a synchronous copy pair setting command is issued even if the setting of an asynchronous copy pair is not yet completed. Note that any component similar to that of the first embodiment described above is provided with the same reference numeral, and is not described again.

Figure 23:
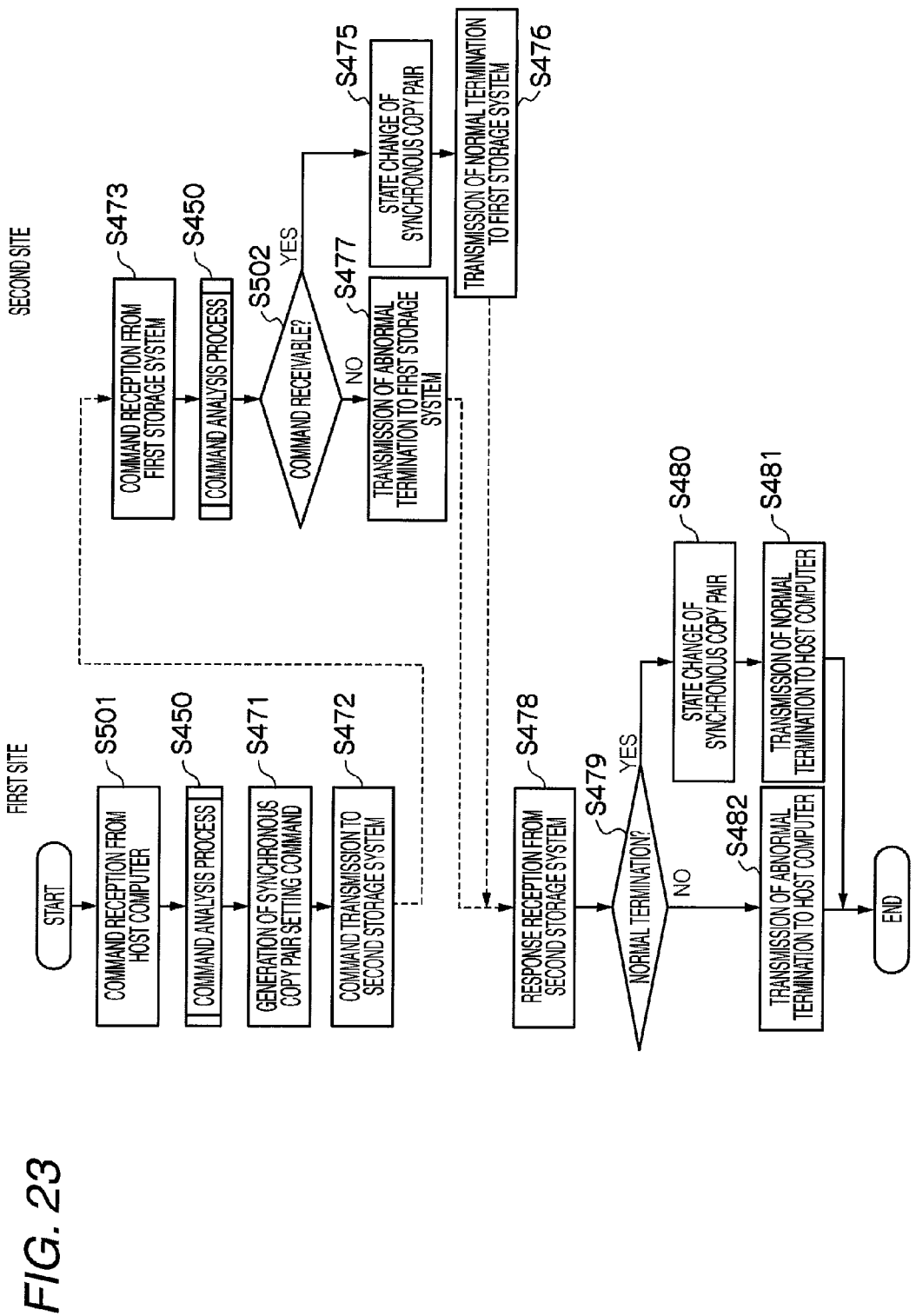
FIG. 23 is a flowchart of a synchronous copy pair command process.

FIG. 23 is a flowchart of a synchronous copy pair command process. As shown in FIG. 23, the synchronous copy pair command process is almost the same as the synchronous copy pair setting process S470 of FIG. 21. However, when the host computer 41 issues a synchronous copy pair setting command in the first storage system 10 before the process of S471, the command reception section 611 of the first storage system 10 receives the synchronous copy pair setting command from the host computer 41 (S501), and the command analysis section 612 executes the command analysis process (S450).

In the second storage system 20, the process of S502 is executed as an alternative to the process of S474. That is, the command analysis section 612 reads, from the volume information table 400 in the shared memory 80, any line (record) of the logical volume number field 400A storing a number the same as that of the secondary logical volume (S-VOL) specified by the synchronous copy pair setting command, and refers to the volume state field 400B of the line (record). The command analysis section 612 also reads, from the pair management table 500 in the shared memory 80, any line (record) of the self logical volume number field 500A storing a number the same as that of the secondary logical volume (S-VOL) specified by the synchronous copy pair setting command, storing "primary" in the self volume attribute field 500B, and storing "asynchronous" in the pair type field 500E. The command analysis section 612 then refers to the pair state field 500F of the line (record) read as such. Based on the volume state field 400B and the pair state field 500F, the command analysis section 612 determines whether or not the synchronous copy pair setting command can be received (S502). To be specific, when the volume state field 400B of the line (record) is showing "normal", and when the pair state field 500F is showing "PAIR", the determination will be made as YES, i.e., the command can be received, and when the volume state field 400B is not showing "normal" and when the pair state field 500F is not showing "PAIR", the determination will be made as NO, i.e., the command cannot be received. Note that, when the volume state field 400B is showing "normal" but when the pair state field 500F is not showing "PAIR", a recovery code corresponding to the contents of the pair state field 500F is transmitted together with the notification of abnormal termination to the first storage system 10 in the process of S477.

When such a recovery code is forwarded to the first storage system 10 together with the notification of abnormal termination in the process of S477, in the process of S482, the recovery code is forwarded to the host computer 41 together with the notification of abnormal termination. Upon reception of the notification of abnormal termination and the recovery code, the host computer 41 displays such an error screen G01 as shown in FIG. 24 on the management terminal screen.

Figure 24:
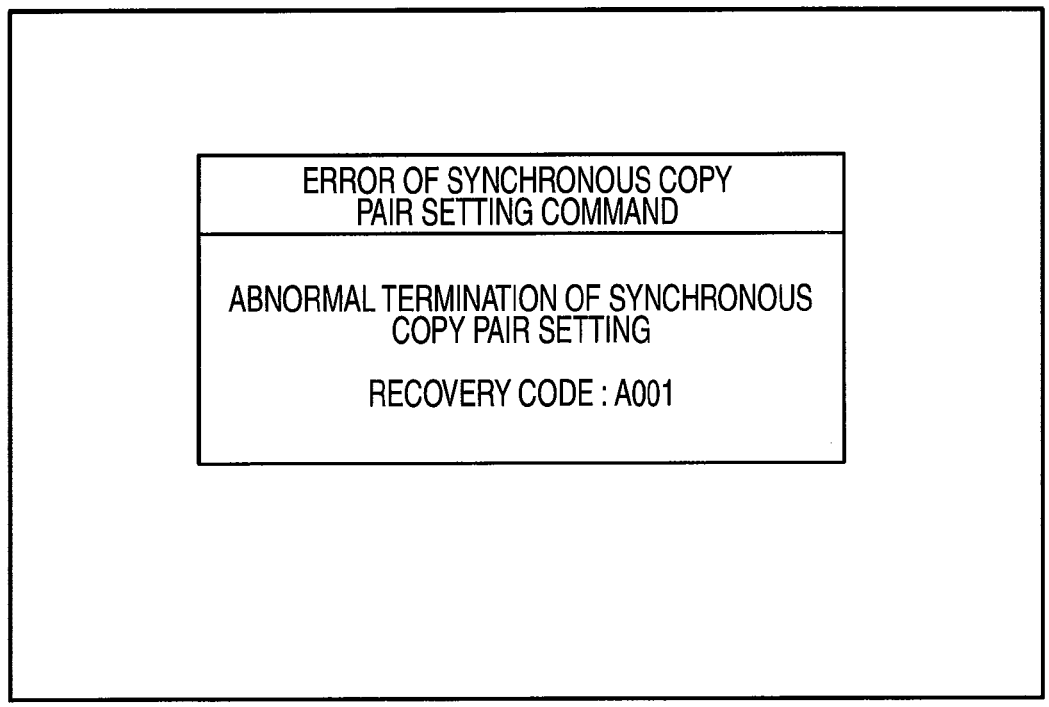
FIG. 24 is a conceptual diagram for illustrating an exemplary error screen to be displayed on a host computer.

FIG. 24 is a conceptual diagram for illustrating an exemplary error screen to be displayed on the host computer. As shown in FIG. 24, the error screen G01 displays the recovery code provided by the first storage system 10 together with a message telling that the synchronous copy pair setting is terminated in error. With such an error screen G01, an operator goes through processes in accordance with the recovery code. When "A001" is displayed as the recovery code as shown in FIG. 24, for example, the operator issues an asynchronous copy pair command for setting of the asynchronous copy pair first. In this manner, in the remote copy system 100 in need of designing the cascade configuration, any synchronous copy pair is prevented from being set first.

Figure 25:
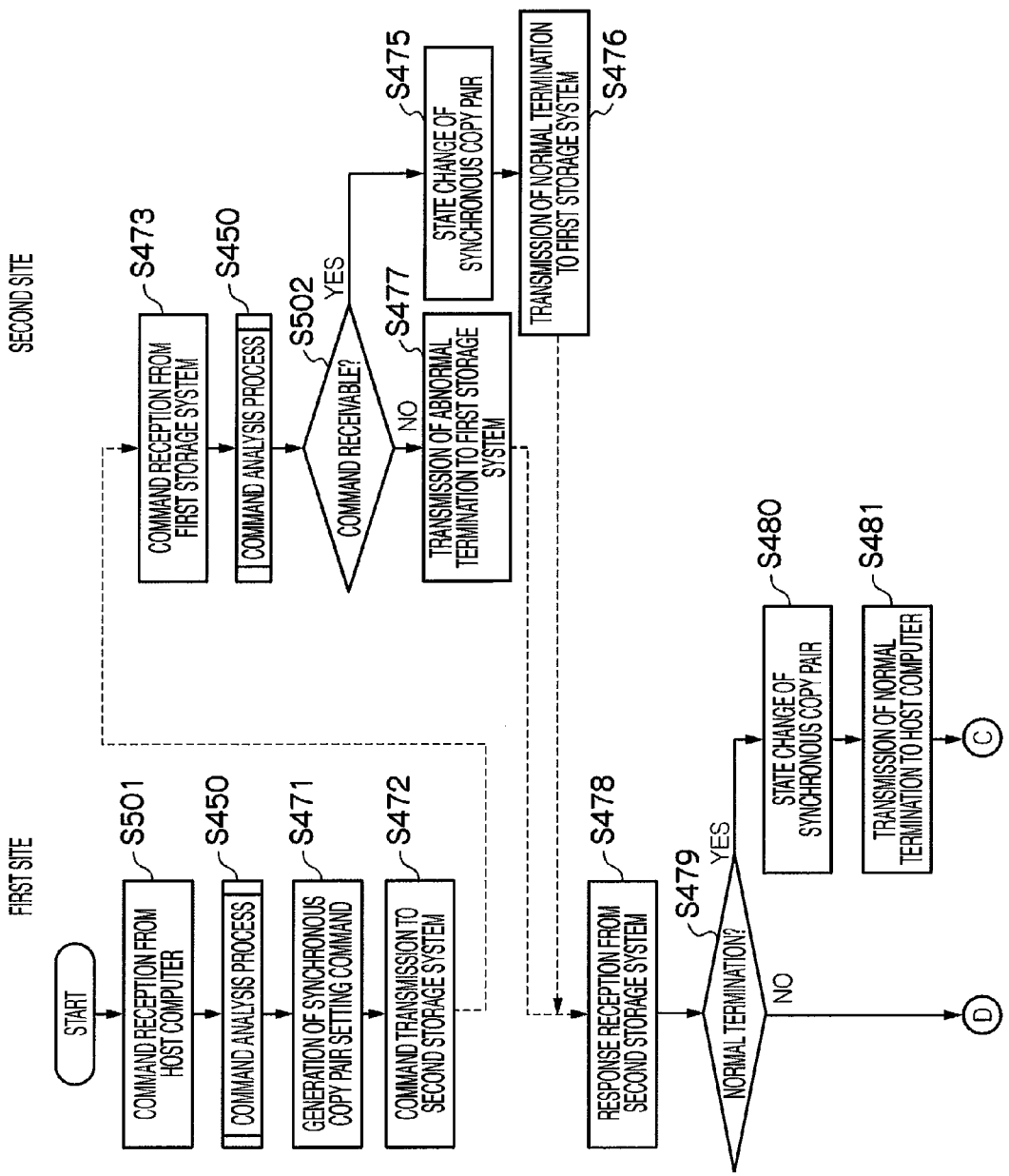
FIG. 25 is a flowchart of a modified example of the synchronous copy pair command process of FIG. 23.
Figure 26:
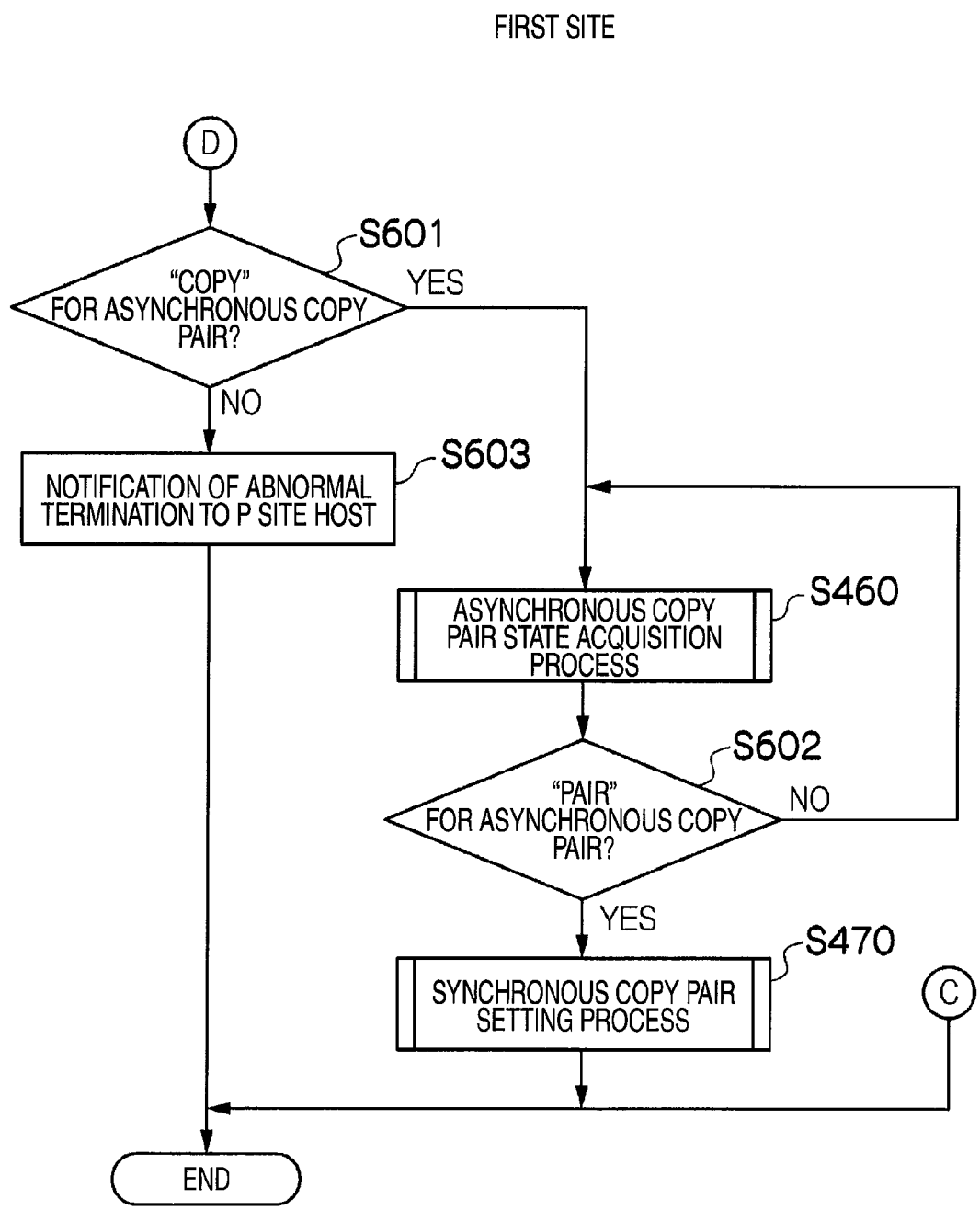
FIG. 26 is another flowchart of the modified example of the synchronous copy pair command process of FIG. 23.

FIGS. 25 and 26 are each a flowchart for illustrating a modified example of the synchronous copy pair command process of FIG. 23. As shown in FIG. 25, the process will be almost the same as the synchronous copy pair command process of FIG. 23. However, when the determination result in S479 is NO, i.e., the response from the second storage system 20 is not normal termination, i.e., abnormal termination, in the first storage system 10, the process of FIG. 26 is executed as an alternative to the process of S482. As shown in FIG. 26, based on the recovery code provided by the second storage system 20 together with the notification of abnormal termination, the command analysis section 612 determines whether the pair state of the asynchronous copy pair is "COPY" or not (S601). In this embodiment, when the pair state of the asynchronous copy pair is "COPY", the recovery code is "A002", for example.

When the determination result of S601 tells that the pair state of the asynchronous copy pair is "COPY", the asynchronous copy pair state acquisition process of FIG. 20 is executed (S460). After executing the asynchronous copy pair state acquisition process S460, the command analysis section 612 determines whether the pair state of thus acquired asynchronous copy pair is "PAIR" or not (S602), and if not, the asynchronous copy pair state acquisition process S460 is repeated until the pair state of the asynchronous copy pair becomes "PAIR". When the determination result of S602 tells that the pair state of the asynchronous copy pair is "PAIR", the synchronous copy pair setting process of FIG. 21 is executed (S470), and the first storage system 10 ends the process. As such, when an asynchronous copy pair is in the copy process, the setting of a synchronous copy pair is not started until the asynchronous copy pair is through with the copy process. Therefore, when the pair state of the asynchronous copy pair is not "PAIR", any possible errors can be uniformly prevented from occurring.

Figure 27:
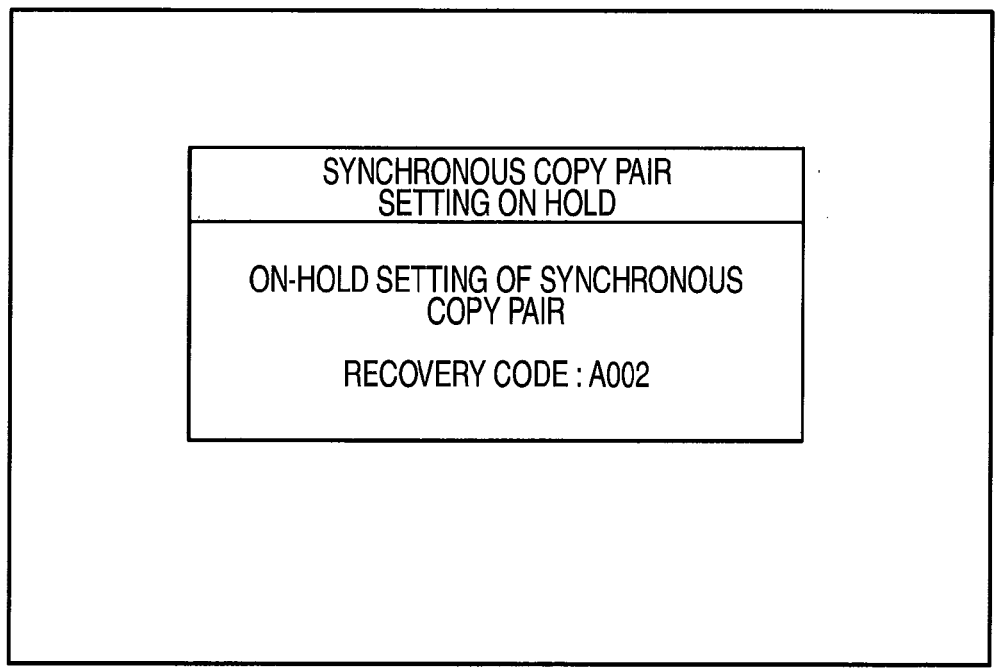
FIG. 27 is a conceptual diagram for illustrating an exemplary on-hold screen to be displayed on the host computer.

Note that, while repeating the asynchronous copy pair state acquisition processes S460 and S602 described above when the determination result of S601 tells that the pair state of the asynchronous copy pair is "COPY", preferably, the command issue section 614 forwards the pair state of the asynchronous copy pair to the host computer 41, and the host computer 41 displays such a on-hold screen G02 as shown in FIG. 27 on the management terminal screen.

FIG. 27 is a conceptual diagram for illustrating an exemplary on-hold screen for display on the host computer. As shown in FIG. 27, the on-hold screen G02 displays the recovery code provided by the first storage system 10 together with a message telling that the setting of a synchronous copy pair is now on hold. This informs the operator of the reason why the setting of a synchronous copy pair is on hold, and the pair state of the asynchronous copy pair.

When the determination result of S601 tells that the pair state of the asynchronous copy pair is not "COPY", or when no recovery code is provided, the command issue section 614 forwards a notification of abnormal termination to the host computer 41 (S603), and the first storage system 10 ends the process.

Third Embodiment

By referring to FIG. 28, described next is a third embodiment of the invention. The third embodiment is different from the first embodiment in the respect that asynchronous copy pairs are deleted in the remote copy system 100 designing the cascade configuration. Note that any component similar to that in the first embodiment described above is provided with the same reference numeral, and not described again.

In the remote copy system 100 designing the cascade configuration in the first embodiment, for deletion of the cascade configuration, if a pair with the logical volume (Data1) 150 being a primary logical volume (P-VOL) is deleted before deleting a pair with the logical volume (Data1) 150 being a secondary logical volume (S-VOL), similarly to the first embodiment, the second storage system 20 includes no writing destination for the write data 610. Moreover, because there is no pair between the logical volumes of the second and third storage systems, data update of the logical volume (ORG1) 110 of the first storage system 10 cannot be reflected to the logical volume (Data2) 200 of the third storage system 30. Accordingly, for deleting the cascade configuration with respect to any virtual volume, there needs to be deleted first a pair with a virtual volume being a secondary logical volume (S-VOL) before deleting a pair with a virtual volume being a primary logical volume (P-VOL).

Figure 28:
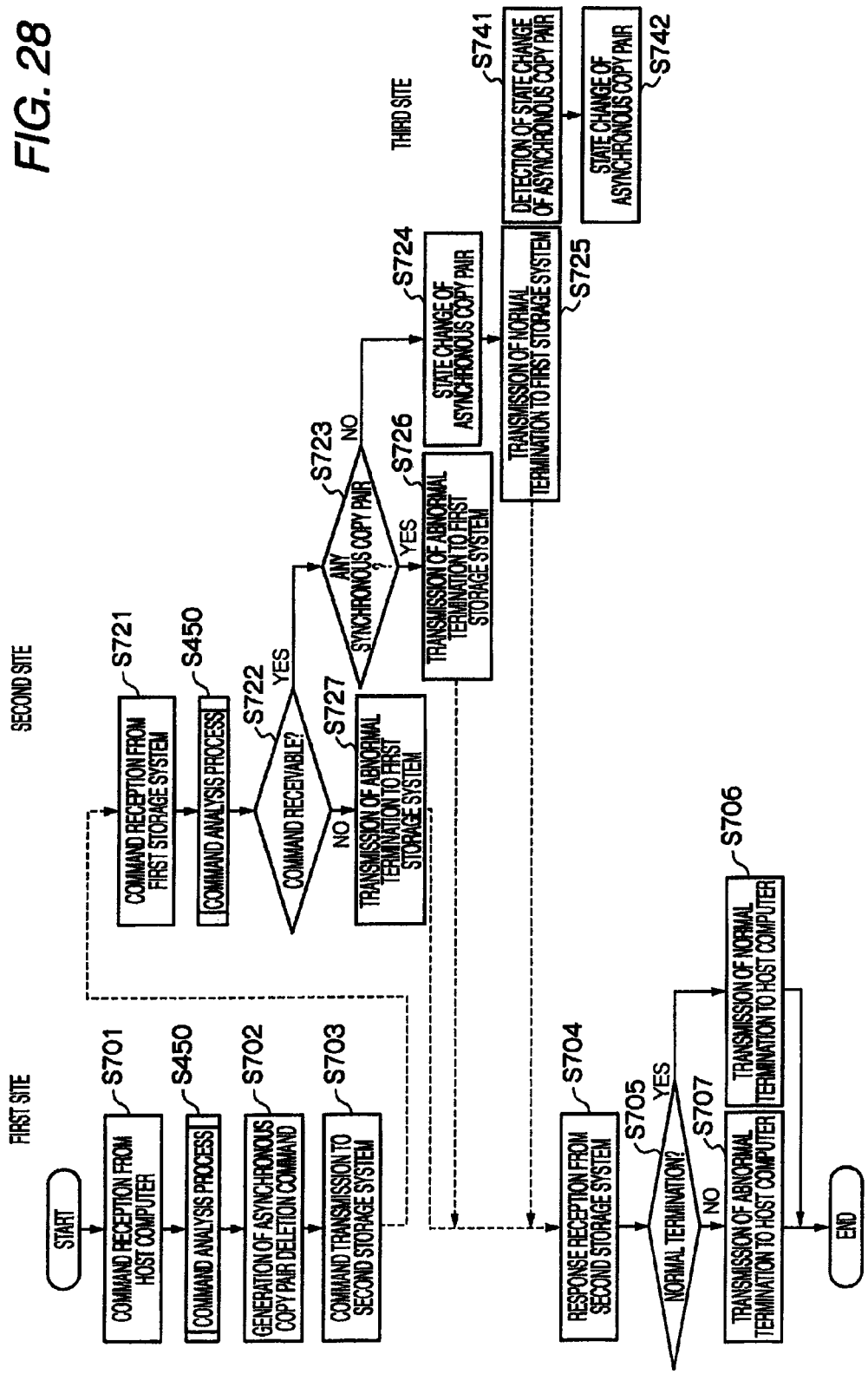
FIG. 28 is a flowchart for illustrating an asynchronous copy pair deletion process.

FIG. 28 is a flowchart of an asynchronous copy pair deletion process. As shown in FIG. 28, when the host computer 41 issues an asynchronous copy pair deletion command, the command reception section 611 of the first storage system 10 receives the asynchronous copy pair deletion command from the host computer 41 (S701). The command analysis section 612 then goes through the command analysis process of FIG. 19 (S450). Based on the process result of the command analysis process S450, the command conversion section 613 generates an asynchronous copy pair deletion command similar to the received asynchronous copy pair deletion command (S702), and the command issue section 614 forwards the thus generated asynchronous copy pair deletion command to the second storage system 20 (S703).

The command reception section 611 of the second storage system 20 receives the asynchronous copy pair deletion command from the first storage system 10 (S721). The command analysis section 612 goes through the command analysis process of FIG. 19 (S450). The command analysis section 612 then reads, from the volume information table 400 in the shared memory 80, any line (record) of the logical volume number field 400A storing a number the same as that of the primary logical volume (P-VOL) specified by the asynchronous copy pair deletion command, for example, and based on the volume state field 400B of the line (record) read as such, determines whether the asynchronous copy pair deletion command can be received or not (S722). To be specific, when the volume state field 400B of the line (record) is showing "normal", the determination will be made as YES, i.e., the command can be received, and when not showing, the determination will be made as NO, i.e., the command cannot be received.

When the determination result of S722 tells that the asynchronous copy pair deletion command can be received, the command analysis section 612 reads, from the pair management table 500 in the shared memory 80, any line (record) of the other-end logical volume number field 500G storing a number the same as that of the primary logical volume (P-VOL) specified by the asynchronous copy pair deletion command, and based on the pair type field 500E and the pair state field 500F of the line (record) as such, determines whether there is any synchronous copy pair (S723). To be specific, when the pair type field 500E of the line (record) is showing "synchronous", and when the pair state field 500F thereof is showing "PAIR" or "COPY", the determination will be made as YES, i.e., there is a synchronous copy pair, and when the pair type field 500E is not showing "synchronous", or when the pair state field 500F is not showing "PAIR" or "COPY", the determination will be made as NO, i.e., there is no synchronous copy pair. Note that, as described above, because the copy process for a synchronous copy pair is completed in a very short time, the pair state field 500F hardly shows "COPY".

When the determination result of S723 tells that there is no synchronous copy pair, the pair state change section 615 reads, from the pair management table 500 in the shared memory 80, any line (record) of the self logical volume number field 500A storing a number the same as that of the primary logical volume (P-VOL) specified by the asynchronous copy pair deletion command, and storing "primary" in the self volume attribute 500B. The pair state change section 615 then changes the pair state field 500F of the line (record) read as such, and writes the change to the pair management table 500 in the shared memory 80 (S724). To be specific, the pair state field 500F is changed from "PAIR" to "Deleting".

After the pair state field 500F is changed as such, the command issue section 614 forwards a notification of normal termination to the first storage system 10 (S725). On the other hand, when the determination result of S723 tells that there is a synchronous copy pair, the command issue section 614 forwards a notification of abnormal termination to the first storage system 10 (S726). When the determination result of S722 tells that the asynchronous copy pair deletion command cannot be received, the command issue section 614 also forwards the notification of abnormal termination to the first storage system 10 (S727).

At the same time as the processes of the first and second storage systems 10 and 20, the third storage system 30 is forwarding the asynchronous copy pair state acquisition command to the second storage system 20 at any appropriate timing. When detecting any change of the pair state field 500F in S724 (S741), the pair state change section 615 of the third storage system 30 reads, from the pair management table 500 in the shared memory 80, any line (record) of the self logical volume number field 500A storing a number the same as that of the secondary logical volume (S-VOL) specified by the asynchronous copy pair state acquisition command, for example. The pair state change section 615 changes the pair state field 500F of the line (record) read as such, and writes the change to the pair management table 500 in the shared memory 80 (S742). To be specific, the pair state field 500F is changed from "PAIR" to "Deleting".

The command reception section 611 of the first storage system 10 receives a response from the second storage system 20 (S704). The command analysis section 612 then determines whether the response from the second storage system 20 is notifying normal termination or not (S705), and when the response from the second storage system 20 is notifying normal termination, the command issue section 614 forwards the notification of normal termination to the host computer 41 (S706), and the first storage system 10 ends the process. On the other hand, when the response from the second storage system 20 is not notifying normal termination, i.e., abnormal termination, the command issue section 614 forwards a notification of abnormal termination to the host computer 41 (S707), and the first storage system 10 ends the process. As such, after confirming that there is no synchronous copy pair, i.e., deleted, the asynchronous copy pair is deleted, i.e., the pair state is changed to "Deleting", and thus the copy pairs can be deleted in any appropriate order, thereby being able to prevent any erroneous operation of deleting first an asynchronous copy pair.

While the invention has been described in detail, the foregoing description is in all aspects illustrative and not restrictive. It is understood that numerous other modifications and variations can be devised without departing from the scope of the invention.

What is claimed is:

1. A remote copy system comprising:
   a first storage system managing a first logical volume as a primary logical volume for a synchronous copy pair,
   a second storage system managing a virtual volume as a secondary logical volume for the synchronous copy pair and a primary logical volume for an asynchronous copy pair, and
   a third storage system managing a second logical volume as a secondary logical volume for the asynchronous copy pair and storing a copy of data,
   wherein, after changing a state of an asynchronous copy using the asynchronous copy pair to a state of copying, the remote copy system is configured to change a state of a synchronous copy using the synchronous copy pair to a state for copying while the state of the asynchronous copy is in the state for copying so that the data stored in the first logical volume is transferred from the first storage system to the third storage system via the virtual volume of the second storage system based on the synchronous copy and asynchronous copy.

2. The remote copy system according to claim 1, wherein the virtual volume is provided virtually so as to allow the first storage system to specify a storage area provided virtually by the second storage system.

3. The remote copy system according to claim 1,
wherein the copying process of the asynchronous copy pair starts after a setting of the asynchronous copy pair is completed, and
wherein the copying process of the synchronous copy pair starts after a setting of the synchronous copy pair is completed.

4. The remote copy system according to claim 1,
wherein the second storage system executes no writing process of the data sent from the first storage system to the virtual volume.

5. The remote copy system according to claim 1, further being configured to:
analyze a command sent from the host computer to determine whether or not a process of cascade configuration should be executed.

6. The remote copy system according to claim 5, further being configured to:
if the command is not receivable for the remote copy system, transmit a notification of abnormal termination.

7. A method for remote copy in a remote copy system, which is coupled to a host computer, and comprises:
a first storage system managing a first logical volume as a primary logical volume for a synchronous copy pair,
a second storage system managing a virtual volume as a secondary logical volume for the synchronous copy pair and primary logical volume for an asynchronous copy pair, and
a third storage system managing a second logical volume as a secondary logical volume for the asynchronous copy pair,
the method comprising the steps of:
after changing a state of an asynchronous copy using the asynchronous copy pair to a state of copying, changing a state of an synchronous copy using the synchronous copy pair to a state for copying while the state of the asynchronous copy is in the state copying,
storing a data in the first logical volume from the host computer, and
transferring a copy of the data stored in the first logical volume from the first storage system to the third storage system via the virtual volume of the second storage system based on the synchronous copy and the asynchronous copy.

8. The method for remote copy according to claim 7,
wherein the virtual volume is provided virtually so as to allow the first storage system to specify a storage area provided virtually by the second storage system.

9. The method for remote copy according to claim 7, further comprising the steps of:
starting copying of the asynchronous copy pair after a setting of the asynchronous copy pair is completed; and
starting copying of the synchronous copy pair after a setting of the synchronous copy pair is completed.

10. The method for remote copy according to claim 7, further comprising the step of:
executing no writing process of the data sent from the first storage system to the virtual volume.

11. The method for remote copy according to claim 7, further comprising the step of:
analyzing a command sent from the host computer to determine whether or not a process of cascade configuration should be executed.

12. The method for remote copy according to claim 11, further comprising the step of:
if the command is not receivable for the remote copy system, transmitting a notification of abnormal termination.

13. A second storage system to be coupled to a remote storage system including:
a first storage system managing a first logical volume as a primary logical volume for a synchronous copy pair, and
a third storage system managing a second logical volume as a secondary logical volume for an asynchronous copy pair,
the second storage system comprising an adapter which receives data sent from the first storage system and a cache memory storing a copy of the data,
wherein, after changing a state of an asynchronous copy using the asynchronous copy pair to a state of copying, the second storage system is configured to change a state of the synchronous copy using the synchronous copy pair to a state for copying while the state of the asynchronous copy is in the state for copying so that the data stored in the first logical volume transferred from the first storage system to the third storage system via the virtual volume of the second storage system based on the synchronous copy and the asynchronous copy.

14. The second storage system according to claim 13,
wherein the virtual volume is provided virtually so as to allow the first storage system to specify a storage area provided virtually by the second storage system.

15. The second storage system according to claim 13,
wherein the copying process of the asynchronous copy pair starts after a setting of the asynchronous copy pair is completed, and
wherein the copying process of the synchronous copy pair starts after a setting of the synchronous copy pair is completed.

16. The second storage system according to claim 13, further being configured to:
execute no writing process of the data sent from the first storage system to the virtual volume.

17. A remote copy system comprising:
a first storage system including a first adapter receiving data sent from a host computer and a first cache memory storing the data received from the host computer, and the first storage system manages a first logical volume as a primary logical volume for a synchronous copy pair,
a second storage system including a second adapter receiving data sent from the first storage system and a second cache memory storing the data received from the first storage system, and the second storage system manages a virtual volume as a secondary logical volume for the synchronous copy pair and a primary logical volume for an asynchronous copy pair, and
a third storage system including a third adapter receiving data sent from the second storage system and a third cache memory storing the data received from the second storage system, and the third storage system manages a second logical volume as a secondary logical volume for the asynchronous copy pair and stores a copy of the data stored in the first logical volume,
wherein, while a state of an asynchronous copy is in the state for copying, the asynchronous copy, using the asynchronous copy pair, is started before a synchronous copy, using the synchronous copy pair, is started so that the data stored in the first logical volume is transferred from the first storage system to the third storage system via the virtual volume of the second storage system based on the synchronous copy pair and the asynchronous copy pair.

18. The remote copy system according to claim 17,
wherein the virtual volume is provided virtually so as to allow the first storage system to specify a storage area provided virtually by the second storage system.

19. The remote copy system according to claim 17,
wherein, during a resynchronization process, the asynchronous copy pair is completed before the synchronous copy pair is started.

20. The remote copy system according to claim 17,
wherein the copying process of the asynchronous copy pair starts after a setting of the asynchronous copy pair is completed, and
wherein the copying process of the synchronous copy pair starts after a setting of the synchronous copy pair is completed.

21. The remote copy system according to claim 17,
wherein the second storage system executes no writing process of the data sent from the first storage system to the virtual volume.

22. The remote copy system according to claim 17, further being configured to:
analyze a command sent from the host computer to determine whether or not a process of cascade configuration should be executed.

23. The remote copy according to claim 22, further being configured to:
if the command is not receivable for the remote copy system, transmit a notification of abnormal termination.

24. The remote copy system according to claim 17, wherein the virtual volume is not accompanied with any substantial storage capacity as a writing destination for data received from the first storage system.

25. The remote copy system according to claim 17, wherein upon reception of a write request, the first storage system stores the write data to a physical volume assigned to the first logical volume, whereas the second storage system does not store a write data to a physical volume upon reception of the write data to the virtual volume.

26. The remote copy system according to claim 17, wherein upon reception of the write request to the virtual volume, the second storage store updates data of the write request in a cache memory.

27. A method for remote copy in a remote copy system, which is coupled to a host computer, and comprises
a first storage system managing a first logical volume as a primary logical volume for a synchronous copy pair,
a second storage system managing a virtual volume as a secondary logical volume for the synchronous copy pair and primary logical volume for an asynchronous copy pair, and
a third storage system managing a second logical volume as a secondary logical volume for the asynchronous copy pair,
the method comprising the steps of:
while a state of an asynchronous copy is in the state for copying, starting the asynchronous copy, using the asynchronous copy pair, before starting a synchronous copy pair, using the synchronous copy pair,
storing a data in the first logical volume from the host computer, and
transferring a copy of the data stored in the first logical volume from the first storage system to the third storage system via the virtual volume of the second storage system based on the synchronous copy and the asynchronous copy.

28. The method for remote copy according to claim 27,
wherein the virtual volume is provided virtually so as to allow the first storage system to specify a storage area provided virtually by the second storage system.

29. The method for remote copy according to claim 27,
wherein, during a resynchronization process, the asynchronous copy pair is completed before the synchronous copy pair is started.

30. The method for remote copy according to claim 27, further comprising the steps of:
starting copying of an asynchronous copy pair after a setting of the asynchronous copy pair is completed; and
starting copying of a synchronous copy pair after a setting of the synchronous copy pair is completed.

31. The method for remote copy according to claim 27, further comprising the step of:
executing no writing process of the data sent from the first storage system to the virtual volume.

32. The method for remote copy according to claim 27, further comprising the step of:
analyzing a command sent from the host computer to determine whether or not a process of cascade configuration should be executed.

33. The method for remote copy according to claim 32, further comprising the step of:
if the command is not receivable for the remote copy system, transmitting a notification of abnormal termination.

34. The method for remote copy according to claim 27, wherein the virtual volume is not accompanied with any substantial storage capacity as a writing destination for data received from the first storage system.

35. The method for remote copy according to claim 27, wherein upon reception of a write request, the first storage system stores the write data to a physical volume assigned to the first logical volume, whereas the second storage system does not store a write data to a physical volume upon reception of the write data to the virtual volume.

36. The method for remote copy according to claim 27, wherein upon reception of the write request to the virtual volume, the second storage store updates data of the write request in a cache memory.

37. A second storage system to be coupled a remote storage system including:
a first storage system managing a first logical volume as a primary logical volume for a synchronous copy pair, and
a third storage system a second logical volume as a secondary logical volume for an asynchronous copy pair,
the second storage system comprising an adapter which receives data sent from the first storage system and a cache memory storing a copy of the data stored in the first logical volume, the second storage system manages a virtual volume as a secondary logical volume for the synchronous copy pair and primary logical volume for the asynchronous copy pair,
wherein, while a state of an asynchronous copy is in the state for copying, the asynchronous copy, using the asynchronous copy pair, is started before a synchronous copy, using the synchronous copy pair, is started so that the data stored in the first logical volume is transferred from the first storage system to the third storage system via the virtual volume of the second storage system based on the synchronous copy and the asynchronous copy.

38. The second storage system according to claim 37,
wherein the virtual volume is provided virtually so as to allow the first storage system to specify a storage area provided virtually by the second storage system.

39. The second storage system according to claim 37,
wherein, during a resynchronization process, the asynchronous copy pair is completed before the synchronous copy pair is started.

40. The second storage system according to claim 37,
wherein the copying process of the asynchronous copy pair starts after a setting of the asynchronous copy pair is completed, and
wherein the copying process of a synchronous copy pair starts after a setting of the synchronous copy pair is completed.

41. The second storage system according to claim 37, further being configured to:
execute no writing process of the data sent from the first storage system to the virtual volume.

42. The second storage system according to claim 37, wherein the virtual volume is not accompanied with any substantial storage capacity as a writing destination for data received from the first storage system.

43. The second storage system according to claim 37, wherein upon reception of a write request, the first storage system stores the write data to a physical volume assigned to the first logical volume, whereas the second storage system does not store a write data to a physical volume upon reception of the write data to the virtual volume.

44. The second storage system according to claim 37, wherein upon reception of the write request to the virtual volume, the second storage store updates data of the write request in a cache memory.

45. A remote copy system comprising:
a first storage system managing a first logical volume as a primary volume for a synchronous copy pair,
a second storage system managing a virtual volume as a secondary logical volume for the synchronous copy pair and a primary logical volume for an asynchronous copy pair, and
a third storage system managing a second logical volume as a secondary logical volume for the asynchronous copy pair and storing a copy of the data,
wherein, while a state of an asynchronous copy is in the state for copying, the asynchronous copy using the asynchronous copy pair is started before a synchronous copy using the synchronous copy pair is started so that the data stored in the first logical volume is transferred from the first storage system to the third storage system via the virtual volume of the second storage system based on the synchronous copy and the asynchronous copy.

* * * * *